US011140720B2

(12) United States Patent
Fakoorian et al.

(10) Patent No.: US 11,140,720 B2
(45) Date of Patent: Oct. 5, 2021

(54) MESSAGE 2 OF A TWO-STEP RANDOM ACCESS PROCEDURE AND COEXISTENCE WITH FOUR-STEP RANDOM ACCESS PROCEDURE

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Jing Sun, San Diego, CA (US); Aleksandar Damnjanovic, Del Mar, CA (US); Srinivas Yerramalli, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/661,609

(22) Filed: Oct. 23, 2019

(65) Prior Publication Data

US 2020/0137803 A1    Apr. 30, 2020

Related U.S. Application Data

(60) Provisional application No. 62/750,070, filed on Oct. 24, 2018.

(51) Int. Cl.
*H04W 72/00* (2009.01)
*H04W 74/08* (2009.01)
(Continued)

(52) U.S. Cl.
CPC ....... *H04W 74/0833* (2013.01); *H04L 1/1819* (2013.01); *H04L 5/0055* (2013.01);
(Continued)

(58) Field of Classification Search
CPC combination set(s) only.
See application file for complete search history.

(56) References Cited

U.S. PATENT DOCUMENTS 10,111,224 B2    10/2018  Lee et al.
10,405,342 B2     9/2019  Wang et al.
(Continued)

FOREIGN PATENT DOCUMENTS

WO    WO-2018127487 A1    7/2018
WO    WO-2018175809 A1 *  9/2018    ........ H04W 74/0833

OTHER PUBLICATIONS

"3rd Generation Partnership Project; Technical Specification Group Radio Access Network; Evolved Universal Terrestrial Radio Access (E-UTRA); Medium Access Control (MAC) Protocol Specification (Release 15)", 3GPP Standard, Technical Specification, 3GPP TS 36.321, 3rd Generation Partnership Project (3GPP), Mobile Competence Centre, 650, Route Des Lucioles, F-06921 Sophia-Antipolis Cedex, France, vol. RAN WG2, No. V15.3.0, Oct. 1, 2018 (Oct. 1, 2018), pp. 1-127, XP051487508, [retrieved on Oct. 1, 2018], Section 1 "Scope" Section 5.1 "Random Access procedure".
(Continued)

*Primary Examiner* — Lakeram Jangbahadur
(74) *Attorney, Agent, or Firm* — Holland & Hart LLP

(57) ABSTRACT

Methods, systems, and devices for wireless communications are described. The method includes identifying that the user equipment (UE) is to use a two-step random access channel (RACH) procedure that includes a first message (e.g., uplink request message) and a second message (e.g., downlink response). The methods include sending, as a first message of the two-step RACH procedure, the uplink request message to a base station, receiving, from the base station, a physical downlink control channel comprising an indication of resources of a broadcast or multicast physical downlink shared channel on which the downlink response is to be
(Continued)

received, and receiving the downlink response from the base station on the broadcast or multicast physical downlink shared channel. The physical downlink shared channel may be configured to provide downlink responses for one or multiple UEs.

26 Claims, 19 Drawing Sheets

(51) Int. Cl.
*H04W 74/00* (2009.01)
*H04W 56/00* (2009.01)
*H04W 76/11* (2018.01)
*H04L 1/18* (2006.01)
*H04L 5/00* (2006.01)

(52) U.S. Cl.
CPC ..... *H04W 56/0045* (2013.01); *H04W 72/005* (2013.01); *H04W 74/006* (2013.01); *H04W 74/0891* (2013.01); *H04W 76/11* (2018.02)

(56) References Cited

U.S. PATENT DOCUMENTS

| | | | |
|---|---|---|---|
| 2018/0110074 A1 | 4/2018 | Akkarakaran et al. | |
| 2018/0124822 A1* | 5/2018 | Wang | H04W 74/006 |
| 2018/0368188 A1 | 12/2018 | Aiba et al. | |
| 2019/0075599 A1* | 3/2019 | Xia | H04B 7/088 |

OTHER PUBLICATIONS

Ericsson: "Feature Lead Summary AI 7.2.4.2 v2", 3GPP Draft, 3GPP TSG-RAN WG1 Meeting #94bis, R1-1811998, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Oct. 11, 2018 (Oct. 11, 2018), XP051519321, 6 Pages, Retrieved from the Internet: URL: http://www.3gpp.org/ftp/tsg%5Fran/WG1%5FRL1/TSGR1%5F94b/Docs/R1%2D1811998%2Ezip [retrieved on Oct. 11, 2018], the whole document.
LG Electronics, et al., "WF on DL DMRS for Broadcast/Multicast PDSCH", 3GPP Draft, 3GPP TSG RAN WGI NR Ad-HOC#2, R1-1711770 WF on DMRS for Broadcast PDSCH V1, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 28, 2017 (Jun. 28, 2017), XP051305968, pp. 1-3, Retrieved from the Internet: URL: http://www.3gpp.org/ftp/tsg_ran/WG1_RL1/TSGR1_AH/NR_AH_1706/Docs/ [retrieved on Jun. 28, 2017], the whole document.
Mediatek Inc: "Further Considerations on 2-step RACH", 3GPP Draft, 3GPP TSG-RAN WG2 Meeting #103bis, R2-1813965 Further Considerations on 2-Step RACH, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 27, 2018 (Sep. 27, 2018), XP051523430, 7 Pages, Retrieved from the Internet: URL: http://www.3gpp.org/ftp/tsg%5Fran/WG2%5FRL2/TSGR2%5F103bis/Docs/R2%2D1813965%2Ezip [retrieved on Sep. 27, 2018], the whole document.
Partial International Search Report—PCT/US2019/057848—ISA/EPO—dated Jan. 30, 2020.
Qualcomm Incorporated: "RACH Design for NR-U", 3GPP Draft, 3GPP TSGMRAN2#103bis, R2-1814281_RACH_NRU, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 27, 2018 (Sep. 27, 2018), XP051523733, 3 Pages, Retrieved from the Internet: URL: http://www.3gpp.org/ftp/tsg%5Fran/WG2%5FRL2/TSGR2%5F103bis/Docs/R2%2D1814281%2Ezip [retrieved on Sep. 27, 2018], the whole document.
U.S. Appl. No. 62/750,070, filed Oct. 24, 2018, 154 pages.
International Search Report and Written Opinion—PCT/US2019/057848—ISA/EPO—dated Mar. 23, 2020.

\* cited by examiner

MESSAGE 2 OF A TWO-STEP RANDOM ACCESS PROCEDURE AND COEXISTENCE WITH FOUR-STEP RANDOM ACCESS PROCEDURE

CROSS REFERENCE

The present Application for Patent claims the benefit of U.S. Provisional Patent Application No. 62/750,070 by FAKOORIAN et al., entitled "MESSAGE 2 OF A TWO-STEP RANDOM ACCESS PROCEDURE," filed Oct. 24, 2018, assigned to the assignee hereof, and expressly incorporated herein.

BACKGROUND

The following relates generally to wireless communications, and more specifically to message 2 of a two-step random access procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless systems may support random access procedures for establishing communications between a UE and a base station. The random access procedure may involve a series of handshake messages between the UE and the base station. In some cases, it may be desirable to reduce the latency associated with the random access procedure.

SUMMARY

The described techniques relate to improved methods, systems, devices, and apparatuses that support message 2 of a two-step random access procedure. Generally, the described techniques provide for performing a two-step random access procedure based on an access request message (message 1) from a user equipment (UE) and a downlink response message (message 2) sent by a base station in response to the access request message. The two-step random access procedure provides several benefits. For example, the two-step random access procedure as described herein reduces the number of messages used for a random access procedure and correspondingly, reduces the number of listen-before-talk (LBT) procedures performed by a UE when the UE is operating in an unlicensed spectrum. Thus, the described two-step random access procedure improves network efficiency and reduces network latency compared to a four-step random access procedure, which results in power savings for associated UEs. Similarly, a base station, in conjunction with the two-step random access procedure, generating multiple downlink response messages for multiple UEs and multiplexing the multiple downlink responses together in one physical downlink shared channel improves network efficiency, reduces network latency, and reduces UE power consumption compared to operations of a four-step random access procedure.

In some cases, a base station may generate multiple downlink response messages for multiple UEs and multiplex the multiple downlink responses together in one physical downlink shared channel. In some cases, the two-step random access procedure may refrain from implementing an acknowledgement (ACK) and/or a negative acknowledgment (NACK) procedure, and thus may not allow for retransmissions of the multiplexed downlink response messages. In some cases, when a base station sends multiple downlink response messages to multiple UEs, UEs that receive and decode the respective downlink response messages may send an ACK, while UEs that do not successfully receive or decode a downlink response message are not permitted to send a NACK. Retransmissions may be allowed in these instances. In some examples, a base station may send a separate downlink response (in a separate physical downlink shared channel) to each UE from the multiple UEs to enable each UE from the multiple UEs to send its own ACK to the base station upon successfully receiving and decoding its respective downlink response or to refrain from sending a NACK upon failing to successfully receive or decode its respective downlink response.

In some cases, a base station may serve multiple UEs capable of performing the two-step random access procedure. Additionally or alternatively, the base station may serve multiple UEs capable of performing a four-step random access procedure. Additionally or alternatively, the base station may serve multiple UEs capable of performing both the two-step random access procedure and the four-step random access procedure. In one example, system information may indicate a mapping of two sets of resources for the physical random access channel (PRACH). One set of resources may be used by the UE for two-step random access procedures, while a different set of resources may be used by the UE for four-step random access procedures. In some cases, system information may include information guiding the multiple UEs to choose between the two-step random access procedure and the four-step random access procedure. A UE may be allowed to use the four-step random access procedure when the two-step random access procedure fails. Additionally, a UE may use different group random access radio network temporary identifiers to encode random access channel messages so as to distinguish two-step random access procedure messages from four-step random access procedure messages.

A method of wireless communication at a UE is described. The method may include identifying that the UE is to use a two-step RACH procedure, the two-step RACH procedure including an uplink request message and a downlink response, sending, as a first message of the two-step RACH procedure, the uplink request message to a base station, receiving, from the base station, a physical downlink control channel comprising an indication of resources of a broadcast or multicast physical downlink shared channel on which the downlink response is to be received, the physical downlink shared channel being configured to provide downlink responses for multiple UEs, and receiving the downlink response from the base station on the broadcast or multicast physical downlink shared channel, the downlink response being a second message of the two-step RACH procedure.

An apparatus for wireless communication at a UE is described. The apparatus may include a processor, memory coupled with the processor, and instructions stored in the memory. The instructions may be executable by the processor to cause the apparatus to identify that the UE is to use a two-step RACH procedure, the two-step RACH procedure including an uplink request message and a downlink response, send, as a first message of the two-step RACH procedure, the uplink request message to a base station, receive, from the base station, a physical downlink control channel comprising an indication of resources of a broadcast or multicast physical downlink shared channel on which the downlink response is to be received, the physical downlink shared channel being configured to provide downlink responses for multiple UEs, and receive the downlink response from the base station on the broadcast or multicast physical downlink shared channel, the downlink response being a second message of the two-step RACH procedure.

Another apparatus for wireless communication at a UE is described. The apparatus may include means for identifying that the UE is to use a two-step RACH procedure, the two-step RACH procedure including an uplink request message and a downlink response, sending, as a first message of the two-step RACH procedure, the uplink request message to a base station, receiving, from the base station, a physical downlink control channel comprising an indication of resources of a broadcast or multicast physical downlink shared channel on which the downlink response is to be received, the physical downlink shared channel being configured to provide downlink responses for multiple UEs, and receiving the downlink response from the base station on the broadcast or multicast physical downlink shared channel, the downlink response being a second message of the two-step RACH procedure.

A non-transitory computer-readable medium storing code for wireless communication at a UE is described. The code may include instructions executable by a processor to identify that the UE is to use a two-step RACH procedure, the two-step RACH procedure including an uplink request message and a downlink response, send, as a first message of the two-step RACH procedure, the uplink request message to a base station, receive, from the base station, a physical downlink control channel comprising an indication of resources of a broadcast or multicast physical downlink shared channel on which the downlink response is to be received, the physical downlink shared channel being configured to provide downlink responses for multiple UEs, and receive the downlink response from the base station on the broadcast or multicast physical downlink shared channel, the downlink response being a second message of the two-step RACH procedure.

Some examples of the method, apparatuses, and non-transitory computer-readable medium described herein may further include operations, features, means, or instructions for determining a group random access radio network temporary identifier, decoding the physical downlink control channel based on the group random access radio network temporary identifier, decoding the broadcast or multicast physical downlink shared channel in accordance with the indication received on the physical downlink control channel, and identifying that downlink responses for multiple UEs included within the broadcast or multicast physical downlink shared channel may be multiplexed at a media access control layer, where the downlink response intended for the UE may be one of the multiplexed downlink responses.

Some examples of the method, apparatuses, and non-transitory computer-readable medium described herein may further include operations, features, means, or instructions for sending an ACK to the base station after successfully decoding the broadcast or multicast physical downlink shared channel and after identifying the downlink response intended for the UE.

In some examples of the method, apparatuses, and non-transitory computer-readable medium described herein, sending the ACK to the base station may include operations, features, means, or instructions for transmitting the ACK using resources identified by a combination of the acknowledgement resource indicator included in the physical downlink control channel and an additional acknowledgement resource indicator included in the downlink response intended for the UE.

Some examples of the method, apparatuses, and non-transitory computer-readable medium described herein may further include operations, features, means, or instructions for refraining from transmitting a NACK when decoding the physical downlink shared channel may be unsuccessful or the downlink response may be corrupted or unreadable.

Some examples of the method, apparatuses, and non-transitory computer-readable medium described herein may further include operations, features, means, or instructions for receiving, based on refraining from transmitting a NACK, a retransmission of the downlink response intended for the UE.

Some examples of the method, apparatuses, and non-transitory computer-readable medium described herein may further include operations, features, means, or instructions for refraining from transmitting any HARQ feedback with respect to decoding the physical downlink control channel or decoding the broadcast or multicast physical downlink shared channel.

Some examples of the method, apparatuses, and non-transitory computer-readable medium described herein may further include operations, features, means, or instructions for identifying an uplink grant in the downlink response intended for the UE, the uplink grant indicating resources for transmission by the UE of a confirmation message that confirms the UE received the downlink response intended for the UE or the broadcast or multicast physical downlink shared channel, and transmitting the confirmation message based on the uplink grant.

A method of wireless communication at a base station is described. The method may include receiving an uplink request message from a UE, identifying that the uplink request message is a first message of a two-step RACH procedure, sending a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE, and sending the plurality of downlink responses, including the downlink response intended for the UE, to the plurality of UEs via the broadcast or multicast physical downlink shared channel.

An apparatus for wireless communication at a base station is described. The apparatus may include a processor, memory coupled with the processor, and instructions stored in the memory. The instructions may be executable by the processor to cause the apparatus to receive an uplink request message from a UE, identify that the uplink request message is a first message of a two-step RACH procedure, send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE, and send the plurality of downlink responses, including the downlink response intended for the UE, to the plurality of UEs via the broadcast or multicast physical downlink shared channel.

Another apparatus for wireless communication at a base station is described. The apparatus may include means for receiving an uplink request message from a UE, identifying that the uplink request message is a first message of a two-step RACH procedure, sending a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE, and sending the plurality of downlink responses, including the downlink response intended for the UE, to the plurality of UEs via the broadcast or multicast physical downlink shared channel.

A non-transitory computer-readable medium storing code for wireless communication at a base station is described. The code may include instructions executable by a processor to receive an uplink request message from a UE, identify that the uplink request message is a first message of a two-step RACH procedure, send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE, and send the plurality of downlink responses, including the downlink response intended for the UE, to the plurality of UEs via the broadcast or multicast physical downlink shared channel.

Some examples of the method, apparatuses, and non-transitory computer-readable medium described herein may further include operations, features, means, or instructions for multiplexing at a media access control layer of the physical downlink shared channel each of the downlink responses for the plurality of UEs, where the downlink response intended for the UE may be one of the multiplexed downlink responses.

Some examples of the method, apparatuses, and non-transitory computer-readable medium described herein may further include operations, features, means, or instructions for including in each of the plurality of downlink responses at least one of random access preamble index (RAPID), timing advance (TA), cell radio network temporary identifier, and UE identifier, or any combination thereof.

Some examples of the method, apparatuses, and non-transitory computer-readable medium described herein may further include operations, features, means, or instructions for including in the broadcast or multicast physical downlink shared channel an acknowledgement/negative acknowledgement (ACK/NACK) resource indicator (ARI) for each of the plurality of downlink responses to indicate separate ACK/NACK feedback resources for each RAPID.

Some examples of the method, apparatuses, and non-transitory computer-readable medium described herein may further include operations, features, means, or instructions for sending to the plurality of UEs via the broadcast or multicast physical downlink shared channel a retransmission of the physical downlink shared channel.

Some examples of the method, apparatuses, and non-transitory computer-readable medium described herein may further include operations, features, means, or instructions for sending the retransmission after failing to receive an ACK from any of the plurality of UEs within a given time period.

Some examples of the method, apparatuses, and non-transitory computer-readable medium described herein may further include operations, features, means, or instructions for clearing a new data indicator (NDI), and including in the retransmission of the downlink response at least one of the second message from the multiple downlink responses, at least one modified message sent previously in the transmission of the downlink response, or at least one new message transmitted for the first time in the retransmission, or any combination thereof.

Some examples of the method, apparatuses, and non-transitory computer-readable medium described herein may further include operations, features, means, or instructions for including an uplink grant in the second message of the physical downlink control channel, the uplink grant indicating resources for transmission by the UE of a confirmation message, confirming that the UE received the downlink response.

Some examples of the method, apparatuses, and non-transitory computer-readable medium described herein may further include operations, features, means, or instructions for confirming the UE receives the second message based on detecting a transmission of the uplink grant.

Some examples of the method, apparatuses, and non-transitory computer-readable medium described herein may further include operations, features, means, or instructions for refraining from including in the physical downlink control channel at least one of high availability resolution queue (HARQ) process identifier, new data indicator (NDI), and redundancy version identifier (RVID), or any combination thereof, and using a space created by the refraining for transport block (TB) scaling (e.g., in the physical downlink control channel).

Some examples of the method, apparatuses, and non-transitory computer-readable medium described herein may further include operations, features, means, or instructions for including in the physical downlink control channel at least one of new data indicator (NDI), and redundancy version identifier (RVID) for retransmission support.

Some examples of the method, apparatuses, and non-transitory computer-readable medium described herein may further include operations, features, means, or instructions for scrambling a CRC of the physical downlink control channel by group random access radio network temporary identifier (RA-RNTI).

A method of wireless communication at a UE is described. The method may include identifying that the UE is to use a two-step RACH procedure, the two-step RACH procedure including an uplink request message and a downlink response, sending, as a first message of the two-step RACH procedure, the uplink request message to a base station, receiving, from the base station, a physical downlink control channel comprising an indication of resources of a broadcast or multicast physical downlink shared channel on which the downlink response is to be received, the physical downlink shared channel being configured to provide downlink responses for a single UE, and receiving the downlink response from the base station on the broadcast or multicast physical downlink shared channel, the downlink response being a second message of the two-step RACH procedure.

An apparatus for wireless communication at a UE is described. The apparatus may include a processor, memory coupled with the processor, and instructions stored in the memory. The instructions may be executable by the processor to cause the apparatus to identify that the UE is to use a two-step RACH procedure, the two-step RACH procedure including an uplink request message and a downlink response, send, as a first message of the two-step RACH procedure, the uplink request message to a base station, receive, from the base station, a physical downlink control channel comprising an indication of resources of a broadcast or multicast physical downlink shared channel on which the downlink response is to be received, the physical downlink shared channel being configured to provide downlink responses for a single UE, and receive the downlink response from the base station on the broadcast or multicast physical downlink shared channel, the downlink response being a second message of the two-step RACH procedure.

Another apparatus for wireless communication at a UE is described. The apparatus may include means for identifying that the UE is to use a two-step RACH procedure, the two-step RACH procedure including an uplink request message and a downlink response, sending, as a first message of the two-step RACH procedure, the uplink request message to a base station, receiving, from the base station, a physical downlink control channel comprising an indication of resources of a broadcast or multicast physical downlink shared channel on which the downlink response is to be received, the physical downlink shared channel being configured to provide downlink responses for a single UE, and receiving the downlink response from the base station on the broadcast or multicast physical downlink shared channel, the downlink response being a second message of the two-step RACH procedure.

A non-transitory computer-readable medium storing code for wireless communication at a UE is described. The code may include instructions executable by a processor to identify that the UE is to use a two-step RACH procedure, the two-step RACH procedure including an uplink request message and a downlink response, send, as a first message of the two-step RACH procedure, the uplink request message to a base station, receive, from the base station, a physical downlink control channel comprising an indication of resources of a broadcast or multicast physical downlink shared channel on which the downlink response is to be received, the physical downlink shared channel being configured to provide downlink responses for a single UE, and receive the downlink response from the base station on the broadcast or multicast physical downlink shared channel, the downlink response being a second message of the two-step RACH procedure.

Some examples of the method, apparatuses, and non-transitory computer-readable medium described herein may further include operations, features, means, or instructions for decoding the physical downlink control channel, and identifying a UE indication in the decoded physical downlink control channel, the UE indication including a hash of a UE identifier.

Some examples of the method, apparatuses, and non-transitory computer-readable medium described herein may further include operations, features, means, or instructions for analyzing the UE indication in the decoded physical downlink control channel, decoding the physical downlink shared channel after determining the UE indication indicates the second message may be intended for the UE, and identifying the UE identifier in the decoded physical downlink shared channel.

Some examples of the method, apparatuses, and non-transitory computer-readable medium described herein may further include operations, features, means, or instructions for sending an ACK to the base station on a resource indicated in the decoded physical downlink control channel after successful contention resolution determined by successfully decoding the physical downlink shared channel.

Some examples of the method, apparatuses, and non-transitory computer-readable medium described herein may further include operations, features, means, or instructions for triggering the base station to resend the downlink response by failing to send an ACK within a set time period.

A method of wireless communication at a base station is described. The method may include receiving an uplink request message from a UE, identifying that the uplink request message is a first message of a two-step RACH procedure, sending a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide the downlink response for only a single UE, and sending the downlink response to the UE via the broadcast or multicast physical downlink shared channel.

An apparatus for wireless communication at a base station is described. The apparatus may include a processor, memory coupled with the processor, and instructions stored in the memory. The instructions may be executable by the processor to cause the apparatus to receive an uplink request message from a UE, identify that the uplink request message is a first message of a two-step RACH procedure, send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide the downlink response for only a single UE, and send the downlink response to the UE via the broadcast or multicast physical downlink shared channel.

Another apparatus for wireless communication at a base station is described. The apparatus may include means for receiving an uplink request message from a UE, identifying that the uplink request message is a first message of a two-step RACH procedure, sending a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide the downlink response for only a single UE, and sending the downlink response to the UE via the physical downlink shared channel.

A non-transitory computer-readable medium storing code for wireless communication at a base station is described. The code may include instructions executable by a processor to receive an uplink request message from a UE, identify that the uplink request message is a first message of a two-step RACH procedure, send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide the downlink response for only a single UE, and send the downlink response to the UE via the broadcast or multicast physical downlink shared channel.

Some examples of the method, apparatuses, and non-transitory computer-readable medium described herein may further include operations, features, means, or instructions for including in the physical downlink control channel a UE indication that includes a hash of a UE identifier and a random access preamble index (RAPID) combination of the UE.

Some examples of the method, apparatuses, and non-transitory computer-readable medium described herein may further include operations, features, means, or instructions for including in the second message a UE identifier that maps to the hash.

Some examples of the method, apparatuses, and non-transitory computer-readable medium described herein may further include operations, features, means, or instructions for using the UE identifier to replace the HARQ process identifier.

Some examples of the method, apparatuses, and non-transitory computer-readable medium described herein may further include operations, features, means, or instructions for withholding transmission of a downlink response to a second UE when the UE identifier and RAPID combination of the UE and UE identifier and RAPID combination of the second UE both hash to the UE indication.

Some examples of the method, apparatuses, and non-transitory computer-readable medium described herein may further include operations, features, means, or instructions for refraining from retransmitting the downlink response after receiving from the UE an ACK within a set time period.

Some examples of the method, apparatuses, and non-transitory computer-readable medium described herein may further include operations, features, means, or instructions for sending to the UE via the broadcast or multicast physical downlink shared channel a retransmission of the downlink response as originally transmitted after failing to receive an ACK from the UE within a set time period.

A method of wireless communication at a UE is described. The method may include determining whether to use a two-step RACH procedure or a four-step RACH procedure to access a network, identifying, based on the determining, an uplink resource and a radio network temporary identifier to be used for transmission of a first message of either the two-step RACH procedure or the four-step RACH procedure, at least one of the identified uplink resource or the identified radio network temporary identifier being indicative of whether the UE is using the two-step RACH procedure or the four-step RACH procedure, and transmitting the first message using the identified uplink resource or the identified radio network temporary identifier.

An apparatus for wireless communication at a UE is described. The apparatus may include a processor, memory coupled with the processor, and instructions stored in the memory. The instructions may be executable by the processor to cause the apparatus to determine whether to use a two-step RACH procedure or a four-step RACH procedure to access a network, identify, based on the determining, an uplink resource and a radio network temporary identifier to be used for transmission of a first message of either the two-step RACH procedure or the four-step RACH procedure, at least one of the identified uplink resource or the identified radio network temporary identifier being indicative of whether the UE is using the two-step RACH procedure or the four-step RACH procedure, and transmit the first message using the identified uplink resource or the identified radio network temporary identifier.

Another apparatus for wireless communication at a UE is described. The apparatus may include means for determining whether to use a two-step RACH procedure or a four-step RACH procedure to access a network, identifying, based on the determining, an uplink resource and a radio network temporary identifier to be used for transmission of a first message of either the two-step RACH procedure or the four-step RACH procedure, at least one of the identified uplink resource or the identified radio network temporary identifier being indicative of whether the UE is using the two-step RACH procedure or the four-step RACH procedure, and transmitting the first message using the identified uplink resource or the identified radio network temporary identifier.

A non-transitory computer-readable medium storing code for wireless communication at a UE is described. The code may include instructions executable by a processor to determine whether to use a two-step RACH procedure or a four-step RACH procedure to access a network, identify, based on the determining, an uplink resource and a radio network temporary identifier to be used for transmission of a first message of either the two-step RACH procedure or the four-step RACH procedure, at least one of the identified uplink resource or the identified radio network temporary identifier being indicative of whether the UE is using the two-step RACH procedure or the four-step RACH procedure, and transmit the first message using the identified uplink resource or the identified radio network temporary identifier.

Some examples of the method, apparatuses, and non-transitory computer-readable medium described herein may further include operations, features, means, or instructions for receiving system information comprising an indication of a resource mapping between a synchronization signal burst and uplink resources for either the two-step RACH procedure or the four-step RACH procedure, where the identified uplink resource may be one of the uplink resources identified by the resource mapping.

Some examples of the method, apparatuses, and non-transitory computer-readable medium described herein may further include operations, features, means, or instructions for receiving information from a base station regarding whether the UE may be to use the two-step RACH procedure or the four-step RACH procedure.

Some examples of the method, apparatuses, and non-transitory computer-readable medium described herein may further include operations, features, means, or instructions for allocating one or more preambles for a two-step RACH occasion of the two-step RACH procedure, and allocating one or more preambles for a four-step RACH occasion of the four-step RACH procedure.

Some examples of the method, apparatuses, and non-transitory computer-readable medium described herein may further include operations, features, means, or instructions for using the four-step RACH procedure when decoding of a message associated with the two-step RACH procedure fails, where a synchronization signal block may be mapped to a first set of resources of the two-step RACH procedure and to a second set of resources for the four-step RACH procedure.

A method of wireless communication at a base station is described. The method may include identifying that the base station is configured to support both a two-step RACH procedure or a four-step RACH procedure, receiving an uplink request message from a UE, the uplink request message being a first message of either the two-step RACH procedure or the four-step RACH procedure, identifying an uplink resource and a radio network temporary identifier used by the UE in transmission of the uplink request message, determining whether the uplink request message is part of the two-step RACH procedure or the four-step RACH procedure based on at least one of the uplink resource or the radio network temporary identifier associated with the uplink request message, and responding to the UE in accordance with whether the uplink request message is part of the two-step RACH procedure or the four-step RACH procedure.

An apparatus for wireless communication at a base station is described. The apparatus may include a processor, memory coupled with the processor, and instructions stored in the memory. The instructions may be executable by the processor to cause the apparatus to identify that the base station is configured to support both a two-step RACH procedure or a four-step RACH procedure, receive an uplink request message from a UE, the uplink request message being a first message of either the two-step RACH procedure or the four-step RACH procedure, identify an uplink resource and a radio network temporary identifier used by the UE in transmission of the uplink request message, determine whether the uplink request message is part of the two-step RACH procedure or the four-step RACH procedure based on at least one of the uplink resource or the radio network temporary identifier associated with the uplink request message, and respond to the UE in accordance with whether the uplink request message is part of the two-step RACH procedure or the four-step RACH procedure.

Another apparatus for wireless communication at a base station is described. The apparatus may include means for identifying that the base station is configured to support both a two-step RACH procedure or a four-step RACH procedure, receiving an uplink request message from a UE, the uplink request message being a first message of either the two-step RACH procedure or the four-step RACH procedure, identifying an uplink resource and a radio network temporary identifier used by the UE in transmission of the uplink request message, determining whether the uplink request message is part of the two-step RACH procedure or the four-step RACH procedure based on at least one of the uplink resource or the radio network temporary identifier associated with the uplink request message, and responding to the UE in accordance with whether the uplink request message is part of the two-step RACH procedure or the four-step RACH procedure.

A non-transitory computer-readable medium storing code for wireless communication at a base station is described. The code may include instructions executable by a processor to identify that the base station is configured to support both a two-step RACH procedure or a four-step RACH procedure, receive an uplink request message from a UE, the uplink request message being a first message of either the two-step RACH procedure or the four-step RACH procedure, identify an uplink resource and a radio network temporary identifier used by the UE in transmission of the uplink request message, determine whether the uplink request message is part of the two-step RACH procedure or the four-step RACH procedure based on at least one of the uplink resource or the radio network temporary identifier associated with the uplink request message, and respond to the UE in accordance with whether the uplink request message is part of the two-step RACH procedure or the four-step RACH procedure.

Some examples of the method, apparatuses, and non-transitory computer-readable medium described herein may further include operations, features, means, or instructions for multiplexing, in the response to the UE, a random access response (RAR) for the two-step RACH procedure with a RAR for the four-step RACH procedure.

Some examples of the method, apparatuses, and non-transitory computer-readable medium described herein may further include operations, features, means, or instructions for configuring the RAR for the two-step RACH procedure to differ from the RAR for the four-step RACH procedure in at least one aspect.

Some examples of the method, apparatuses, and non-transitory computer-readable medium described herein may further include operations, features, means, or instructions for computing a first radio network temporary identifier for the two-step RACH procedure and a second radio network temporary identifier for the four-step RACH procedure different from the first radio network temporary identifier, and including in the response to the UE either a message for the two-step RACH procedure or a message for the four-step RACH procedure based on whether the uplink request message may be part of the two-step RACH procedure or the four-step RACH procedure.

Some examples of the method, apparatuses, and non-transitory computer-readable medium described herein may further include operations, features, means, or instructions for including in the response to the UE a first preamble for the first radio network temporary identifier and a second preamble for the second radio network temporary identifier.

Some examples of the method, apparatuses, and non-transitory computer-readable medium described herein may further include operations, features, means, or instructions for configuring both the two-step RACH procedure and the four-step RACH procedure at the same time, and mapping a synchronization signal block to a first set of resources of the two-step RACH procedure and to a second set of resources for the four-step RACH procedure.

Some examples of the method, apparatuses, and non-transitory computer-readable medium described herein may further include operations, features, means, or instructions for configuring system information to indicate the first set of resources for a physical random access channel (PRACH) of the two-step RACH procedure and indicate the second set of resources for a PRACH of the four-step RACH procedure.

Some examples of the method, apparatuses, and non-transitory computer-readable medium described herein may further include operations, features, means, or instructions for configuring frequency domain PRACH resources for the two-step RACH procedure and the resources of the four-step RACH procedure.

DETAILED DESCRIPTION

Figure 1:
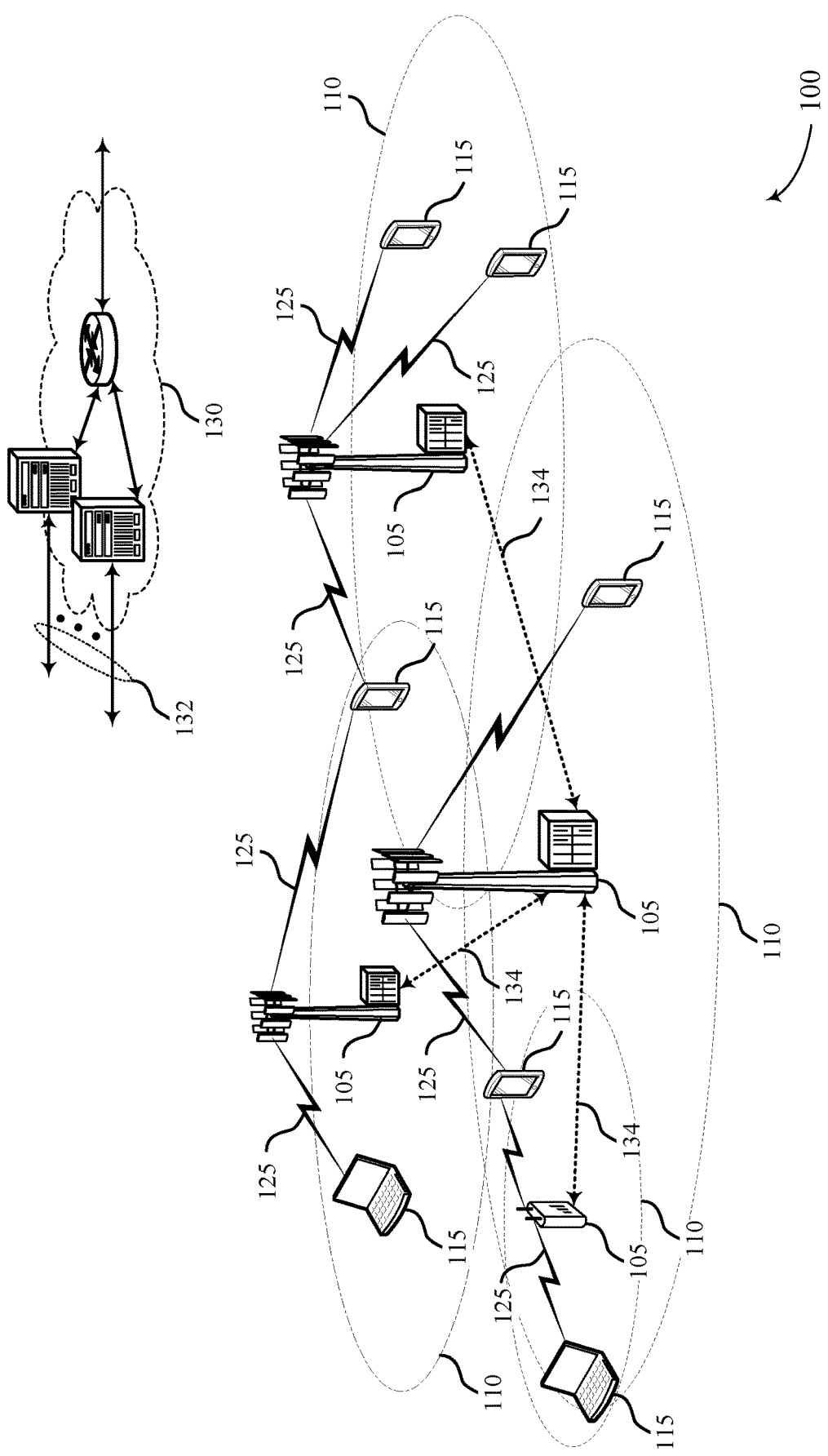
FIG. 1 illustrates an example of a system for wireless communications that supports message 2 of a two-step random access procedure in accordance with aspects of the present disclosure.

A random access procedure may be a four-step procedure that involves a first message sent by a user equipment (UE) to a base station, followed by a second message transmitted by the base station and responsive to the first message. A third message, responsive to the second message, is then transmitted by the UE. The process concludes with a fourth message transmitted by the base station. A UE and base station, however, may be capable of participating in and configured to operate using a two-step random access procedure. In a two-step random access procedure, the UE may transmit an initial message (a message 1, also referred to herein as an access request message) to the base station. In some cases, multiple UEs may each attempt to transmit separate message 1 instances to the base station. The base station may respond to the various UEs with a message 2, also referred to herein as a downlink response message. The downlink response message may be included in a physical downlink shared channel.

In some cases, a base station may generate multiple downlink response messages for multiple UEs and multiplex the multiple downlink responses together in one physical downlink shared channel. For example, a base station may generate a first downlink response message for a first UE and generate a second downlink response message for a second UE, multiplex together the first downlink response message with the second downlink response message, and transmit the multiplexed downlink response messages in a physical downlink shared channel. In some cases, the first downlink response message may be different than the second downlink response message. In other instances, the multiple downlink response messages may be transmitted to the UEs in separate physical downlink shared channels. The physical downlink shared channels will each be preceded by transmission of downlink control information (DCI) on a physical downlink control channel. The base station may use a radio network temporary identifier (e.g., group random access radio network temporary identifier) to scramble a cyclic redundancy check (CRC) parity bit sequence to provide a scrambled CRC bit sequence for the DCI. The group random access radio network temporary identifier may be used by the UEs to identify whether a corresponding physical downlink shared channel message is intended for (or includes a downlink response message) for a specific UE.

In some cases, the two-step random access procedure may refrain from implementing an acknowledgement (ACK) and/or a negative acknowledgment (NACK) procedure, and thus also refrain from supporting retransmissions of the physical downlink shared channel messages. Alternatively, the two-step random access procedure may implement an ACK procedure, and/or may also support retransmissions. In some examples, the ACK procedure may include a UE sending the base station an ACK after successfully receiving and decoding the downlink response. In some examples, UEs that fail to receive or decode the downlink response may refrain from sending a NACK. In some examples, the base station may send a retransmission of the downlink response after failing to receive an ACK or NACK from a UE for which a downlink response message was intended. In some cases, the base station may resend the same transmission again in the retransmission (e.g., all of the same multiplexed downlink responses are sent in the first transmission). Alternatively, the base station may send a transmission different from the first transmission in the retransmission (e.g., send less or more downlink responses in the retransmission than were sent in the first transmission, modify one or more downlink responses from the first transmission and send the one or more modified downlink responses in the retransmission, send one or more modified downlink responses with one or more unmodified downlink responses from the first transmission, etc.).

In some cases, a base station may serve multiple UEs capable of performing the two-step random access procedure. Additionally or alternatively, the base station may serve multiple UEs capable of performing a four-step random access procedure. Additionally or alternatively, the base station may serve multiple UEs capable of performing both the two-step random access procedure and the four-step random access procedure. In one example, system information may indicate a mapping of two sets of resources for the physical random access channel (PRACH). One set of resources may be used by the UE for two-step random access procedures, while a different set of resources may be used by the UE for four-step random access procedures. In some cases, system information may include information guiding the multiple UEs to choose between the two-step random access procedure and the four-step random access procedure. A UE may be allowed to use the four-step random access procedure when the two-step random access procedure fails. The different sets of resources may include different frequency-based resources or different time-based resources, or both. Further, different code-based resources may be used. For example, a UE may use different group random access radio network temporary identifiers to encode random access channel messages so as to distinguish two-step random access procedure messages from four-step random access procedure messages. The base station may do the same, based at least in part on the distinguishing features used by a UE in transmission of its message 1. In some cases, the term "second message" or "message 2" may refer to the payload of the physical downlink shared channel intended for the UE. Alternatively, the term "second message" or "message 2" may refer to a combination of the physical downlink control channel and physical downlink shared channel, responsive to the first message or message 1.

As described herein, a two-step random access procedure may provide multiple benefits. For example, a two-step random access procedure as described herein may reduce the number of messages used for a random access procedure and may correspondingly, reduce the number of listen-before-talk (LBT) procedures that may be performed by a UE when the UE is operating in an unlicensed spectrum. Such reductions may reduce the latency of the random access procedure. Thus, the described two-step random access procedure improves network efficiency and reduces network latency compared to a four-step random access procedure, resulting in power savings for associated UEs. Similarly, a base station, in conjunction with the two-step random access procedure, generating multiple downlink response messages for multiple UEs and multiplexing the multiple downlink responses together in one physical downlink shared channel improves network efficiency, reduces network latency, and reduces UE power consumption compared to operations of a four-step random access procedure.

Aspects of the disclosure are initially described in the context of a wireless communications system. Some aspects of the disclosure are also described in the context of multiple swim diagrams indicating various communications between base stations and UEs in in relation to a two-step random access procedure, or a combination of the two-step random access procedure and a four-step random access procedure. Aspects of the disclosure are further illustrated by and described with reference to apparatus diagrams, system diagrams, and flowcharts that relate to message 2 of a two-step random access procedure.

FIG. 1 illustrates an example of a wireless communications system 100 that supports message 2 of a two-step random access procedure in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communication with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, such as the exemplary range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples, (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more of the base stations 105 may include a communications manager, which may implement a two-step random access procedure. A base station 105 may receive one or more access request messages from a corresponding number of UEs 115. The access request messages may be a message 1 of a two-step random access procedure. In response, the base station 105 may generate multiple downlink response messages for the one or more UEs 115 and multiplex the multiple downlink response together in one physical downlink shared channel. Alternatively, the base station 105 may use multiple physical downlink shared channels to transmit the multiple downlink response messages to the individual UEs 115. Similarly, at least one of the UEs 115 may include a communications manager, which may identify that the at least one UE is to use a two-step random access procedure. As part of the two-step random access procedure, the UE 115 may send, as a first message of the two-step random access procedure, the uplink request message to a base station. The UE 115 may then receive, from the base station, a physical downlink control channel comprising an indication of resources of a broadcast or multicast physical downlink shared channel on which the downlink response is to be received. The UE 115 may then receive the downlink response from the base station on the physical downlink shared channel, the downlink response being a second message of the two-step random access procedure.

Figure 2:
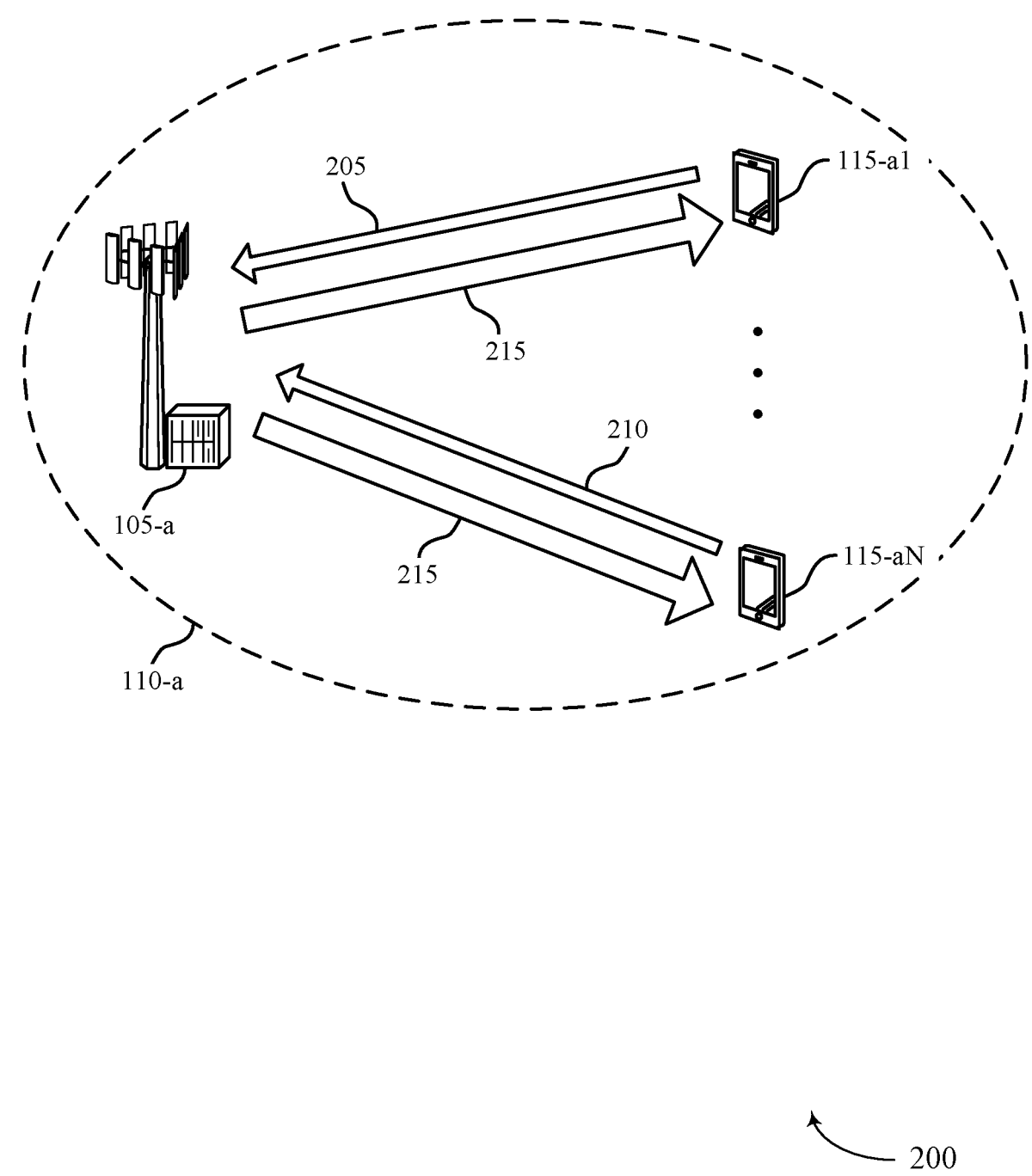
FIG. 2 illustrates an example of a system for wireless communications that supports message 2 of a two-step random access procedure in accordance with aspects of the present disclosure.

FIG. 2 illustrates an example of a wireless communications system 200 that supports message 2 of a two-step random access procedure in accordance with aspects of the present disclosure. In some examples, wireless communications system 200 may implement aspects of wireless communication system 100.

As illustrated, wireless communications subsystem 200 may include at least two UEs (e.g., UE 115-al to UE 115-aN, where N may be an integer of 2 or greater) and base station 105-a, which may be examples of a UE 115 or a base station 105, respectively, as described herein with reference to FIG. 1. Alternatively, wireless communication subsystem 200 may include a single UE (e.g., UE 115-al). Wireless communications subsystem 200 may also include uplink 205 from UE 115-al and uplink 210 from UE 115-aN, as well as downlink 215 from base station 105-a. Base station 105-a may use downlink 215 to convey control and/or data information to one or more UEs (e.g., UE 115-al and/or UE 115-aN). Additionally, UE 115-al may use uplink 205 to convey control and/or data information to base station 105-a, and/or UE 115-aN may use uplink 210 to convey control and/or data information to base station 105-a. In some cases, uplink 205 may use the same or different time and/or frequency resources than uplink 210. Similarly, uplink 205 and/or uplink 210 may use the same or different time and/or frequency resources as downlink 215.

In one example, UE 115-al may determine to use a two-step random access channel (RACH) procedure with base station 105-a. In some cases, may UE 115-al may send an uplink request message to base station 105-a via uplink 205. The uplink request message may be a first message in the two-step RACH procedure. In some cases, base station 105-a may identify that the uplink request message is the first message of the two-step RACH procedure. For example, base station 105-a may identify that the first message contains a payload as well as a random access preamble. In response to the uplink request message, UE 115-al may receive a physical downlink control channel from base station 105-a (e.g., downlink 215). In some cases, the physical downlink control channel from base station 105-1 may indicate resources of a broadcast or multicast physical downlink shared channel on which the downlink response (e.g., second message of the two-step RACH procedure) may be received. Thus, the two-step RACH procedure reduces the number of transmissions, and thus reduces network latency compared to the four-step RACH procedure. In some cases, the physical downlink shared channel may be configured to provide downlink responses for multiple UEs (e.g., UE 115-al to UE 115-aN). Thus, UE 115-aN may send a first message to base station 105-a (e.g., uplink 210) and may also receive a physical downlink control channel from base station 105-a (e.g., downlink 215). In some cases, UE 115-al and UE 115-aN may receive the downlink response from base station 105-a on a physical downlink shared channel (e.g., downlink 215), where the downlink response is a second message in the two-step RACH procedure. In some cases, base station 105-a may multiplex a downlink response for UE 115-al with a downlink response for UE 115-aN and broadcast, via downlink 215, the multiplexed downlink responses to UE 115-*al* and UE 115-aN in the same physical downlink shared channel. In some cases, when base station 105-*a* sends multiple downlink response messages to multiple UEs (e.g., UE 115-*al* to UE 115-aN), a single UE from the multiple UEs may be permitted to send an ACK to the base station, while the rest of the multiple UEs are not permitted to send an ACK. For example, UE 115-*al* with successful contention resolution may send the ACK on corresponding resources, while the UE 115-aN is not permitted to send an ACK. In one example, base station 105-*a* may configure a physical downlink control channel to indicate resources of a broadcast or multicast physical downlink shared channel on which the downlink response is to be received by a single UE. For example, base station 105-*a* may send a downlink response for UE 115-*al* in a first transmission and send a downlink response for UE 115-aN in a second transmission that is separate and independent from the first transmission. In some cases, UE 115-aN may send the uplink request message via uplink 210 and then either not receive a downlink response from base station 105-*a*, may receive a partial or corrupted downlink response, or may receive a downlink response intended for UE 115-*al*. In some cases, when UE 115-aN fails to receive a downlink response, UE 115-aN may refrain from sending a negative acknowledgement (NACK) to base station 105-*a*. In some cases, sending the downlink responses separately (e.g., without multiplexing them) may enable each UE from the multiple UEs (e.g., UE 115-*al* to UE 115-aN) to send its own ACK to base station 105-*a* upon successfully receiving and decoding its respective downlink response. Similarly, sending the downlink responses separately may enable UE 115-*al* and/or UE 115-aN to refrain from sending an ACK upon failing to successfully receive or decode its respective downlink response to trigger base station 105-*a* into sending at least a partial retransmission of a previous transmission.

In some cases, UE 115-*al* may decode the physical downlink control channel and identify a UE indication in the decoded physical downlink control channel. For example, the UE indication may include a hash of a UE identifier. In some examples, UE 115-*al* may analyze the UE indication in the decoded physical downlink control channel and decode the physical downlink shared channel after determining the UE indication indicates the second message is intended for UE 115-*al*. In some cases, UE 115-*al* may identify its UE identifier in the decoded physical downlink shared channel. In some cases, UE 115-*al* may send an acknowledgement (ACK) to base station 105-*a* on a resource indicated in the decoded physical downlink control channel after successful contention resolution determined by successfully decoding the physical downlink shared channel. In some cases, UE 115-*al* may trigger base station 105-*a* to resend the downlink response by failing to send an ACK to base station 105-*a* within a set time period.

In some cases, base station 105-*a* may identify that it is configured to support a two-step RACH procedure, a four-step RACH procedure, or both a two-step RACH procedure and a four-step RACH procedure. In one example, base station 105-*a* may identify an uplink resource and a radio network temporary identifier used by UE 115-*al* in transmission of the uplink request message via uplink 205 and determine whether the uplink request message is part of the two-step RACH procedure or the four-step RACH procedure based at least in part on at least one of the uplink resource or the radio network temporary identifier associated with the uplink request message. In some cases, base station 105-*a* may respond to UE 115-*al* based on whether the uplink request message is part of the two-step RACH procedure or the four-step RACH procedure.

Figure 3:
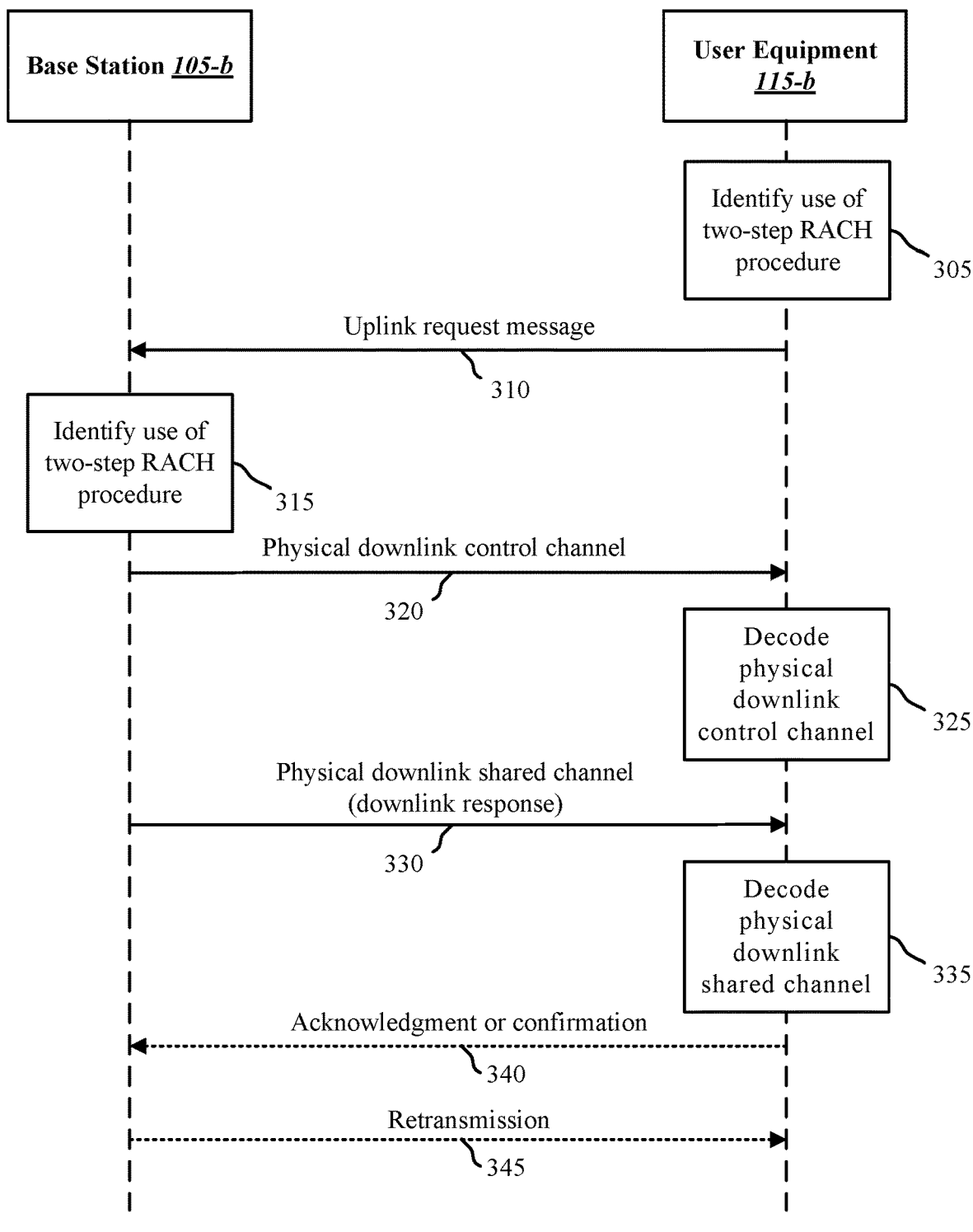
FIG. 3 illustrates an example of a swim diagram that illustrates a wireless communications system that supports message 2 of a two-step random access procedure in accordance with aspects of the present disclosure.

FIG. 3 illustrates an example of a swim diagram 300 that illustrates a wireless communications system that supports message 2 of a two-step random access procedure in accordance with aspects of the present disclosure. In some examples, swim diagram 300 may implement aspects of wireless communication system 100. Swim diagram 300 relates to instances where the message 2 of a two-step random access procedure is included in a physical downlink shared channel message that is intended for multiple UEs.

As illustrated, process 300 may include UE 115-*b* and base station 105-*b*, which may be examples of a UE 115 or a base station 105, as described herein with reference to FIGS. 1-2.

At block 305, UE 115-*b* may identify that the UE 115-*b* is to use a two-step random access channel (RACH) procedure. In some cases, the two-step RACH procedure may include an uplink request message as a first step in the two-step RACH procedure and a downlink response as a second step in the two-step RACH procedure.

At 310, UE 115-*b* may send the uplink request message to base station 105-*b*. In some cases, UE 115-*b* may send the uplink request message as a first message of the two-step RACH procedure. In some cases, the first message of the two-step RACH procedure from UE 115-*b* (e.g., uplink request message at 310) may include a preamble portion and a payload portion. In some instances, the preamble of the uplink request message at 310 may serve as a demodulation reference signal for a payload portion of the uplink request message. In some cases, the payload portion of the uplink request message may be a physical uplink control channel waveform or a physical uplink shared channel waveform. The size of the payload portion of the uplink request message may be fixed or may be a function of a random access procedure use case. As shown, at 310, base station 105-*b* may receive the uplink request message from UE 115-*b*.

At block 315, base station 105-*b* may identify that the uplink request message from UE 115-*b* is a first message of a two-step RACH procedure. In some cases, base station 105-*b* may analyze the uplink request message from UE 115-*b* and identify that the uplink request message is a first message of the two-step RACH procedure based at least on the analysis. In some cases, base station 105-*b* may compute a radio network temporary identifier and use the computed radio network temporary identifier to scramble a cyclic redundancy check (CRC) of the physical downlink control channel. For example, base station 105-*b* may use the computed radio network temporary identifier to scramble a CRC parity bit sequence for the downlink control information (DCI) of the physical downlink control channel.

At 320, base station 105-*b* may send a physical downlink control channel to UE 115-*b*. In some cases, the physical downlink control channel may be configured based on the base station 105-*b* determining that the uplink request message from UE 115-*b* is a first message of a two-step RACH procedure. In some cases, the physical downlink control channel may indicate resources of a broadcast or multicast physical downlink shared channel on which a downlink response to the uplink request message is sent to UE 115-*b*. In some examples, the downlink response may be a second message of the two-step RACH procedure. In some cases, the physical downlink shared channel may be configured to provide a downlink response to each of multiple UEs. In some cases, the term "second message" may refer to the payload of the physical downlink shared channel intended for the UE. Alternatively, the term "second message" may refer to a combination of the physical downlink control channel and physical downlink shared channel, responsive to the first message.

In some examples, HARQ feedback and retransmission may not be supported in a two-step RACH procedure. In some cases, multiple downlink responses (e.g., message 2s) for multiple UEs may be multiplexed together into one physical downlink shared channel. Because of the multiplexing of the payload, the two-step RACH procedure may not support HARQ feedback. In cases where HARQ feedback and retransmission are not supported in the two-step RACH procedure, a UE 115-b may not know there is a downlink response intended for UE 115-b before decoding the physical downlink control channel. Although, in some cases, UE 115-b may be aware of a possibility of receiving a response or may be expecting a response based at least in part on transmitting the uplink request message at 310. In some cases, base station 105-b may refrain from supporting HARQ process ID, new data indicator (NDI), and/or redundancy version identifier (RVID) due to retransmission not being supported. In some cases, the physical downlink control channel may indicate a larger transport block scaling than would be used were HARQ feedback transmitted. In some examples, base station 105-b may use a space created by not supporting HARQ process ID, NDI, and/or RVID for transport block scaling in the physical downlink control channel.

In cases where HARQ feedback and retransmission are supported, NDI and RVID fields may be used for retransmission support. In some cases, an acknowledgement/negative acknowledgement (ACK/NACK) resource indicator (ARI) may be included. In some cases, a downlink response may include at least one of a random access preamble index (RAPID), a timing advance (TA), a cell radio network temporary identifier, or a UE identifier, or any combination thereof. In some examples, the ARI may be used for each of the multiple downlink responses to indicate separate ACK/NACK feedback resources for each RAPID. In some cases, base station 105-b may send the physical downlink control channel to multiple UEs, including UE 115-b, and send a corresponding physical downlink shared channel that includes multiple downlink response messages for the multiple UEs. For example, at least one downlink response message may include a HARQ process ID to enable a first physical downlink shared channel to carry a different downlink response (e.g., different message 2 content) than is carried by a second physical downlink shared channel.

At block 325, after receiving the physical downlink control channel from base station 105-b, UE 115-b may decode the physical downlink control channel. In some cases, UE 115-b may determine a group random access radio network temporary identifier and decode the physical downlink control channel based at least in part on the determined group random access radio network temporary identifier. In some cases, when UE 115-b is able to decode the physical downlink control channel using the radio network temporary identifier, then UE 115-b may determine a physical downlink shared channel will be configured to include a downlink response message (among many downlink response messages) for UE 115-b. When UE 115-b is not enabled to decode the physical downlink control channel using the radio network temporary identifier, UE 115-b may be unable to decode (or may not expect) a physical downlink shared channel from base station 105-b. In some cases, UE 115-b will not send a NACK for failure to decode the PDCCH.

In cases where HARQ feedback and retransmission are not supported, UE 115-b may use at least one of the RAPID, the TA, radio network temporary identifier, or a UE identifier, or any combination thereof, to determine which message in the physical downlink shared channel is intended for UE 115-b. Conversely, in cases where HARQ feedback and retransmission are supported, the UE may use the ARI of the physical downlink control channel and the ARI of the downlink message in the physical downlink shared channel to determine ACK resources.

At 330, base station 105-b may send a downlink response to UE 115-b via a physical downlink shared channel. In the scenario described by swim diagram 300, base station 105-b may send a downlink response to multiple UEs, including UE 115-b, via the broadcast or multicast physical downlink shared channel. In one example, base station 105-b may multiplex together, at a media access control layer of the physical downlink shared channel, each of the downlink responses for the multiple UEs. In some cases, base station 105-b may include in at least one of the multiple downlink responses at least one of a RAPID, a timing advance (TA), a cell radio network temporary identifier, or a UE identifier, or any combination thereof. As shown, UE 115-b may receive the downlink response from base station 105-b on the physical downlink shared channel. In some cases, the downlink response may be a second message in a two-step RACH procedure. In some cases, base station 105-b may include a UL grant in a downlink response to UE 115-b to enable UE 115-b to send a confirmation using the UL grant resources. In some cases, the base station 105-b may receive the confirmation from UE 115-b and identify that the UE 115-b used the UL grant resources to send the confirmation. In some cases, base station 105-b may use the identification that the UE 115-b used the UL grant resources as a confirmation that UE 115-b received the downlink response message.

At block 335, UE 115-b may decode the physical downlink shared channel in order to determine that the physical downlink shared channel includes the downlink response intended for UE 115-b. In one example, UE 115-b may determine that the downlink response to UE 115-b and each of the additional downlink responses for additional UEs included within the physical downlink shared channel are multiplexed together at a media access control layer.

In some instances, as described herein, no ACK feedback or retransmissions are allowed. However, in some instances, as shown at 340, UE 115-b may send an acknowledgement (ACK) or confirmation to base station 105-b after successfully decoding the broadcast or multicast physical downlink shared channel and after identifying the downlink response intended for UE 115-b. In one example, UE 115-b may transmit a confirmation using resources identified in an UL grant included in the downlink response. In one example, UE 115-b may transmit an ACK using resources identified by a combination of the acknowledgement resource indicator included in the physical downlink control channel and an additional acknowledgement resource indicator included in the downlink response intended for the UE. In some cases, UE 115-b may refrain from transmitting a negative acknowledgement (NACK) after failing to successfully decode the physical downlink shared channel and/or after determining that the downlink response is not intended for UE 115-b. In one example, UE 115-b may refrain from transmitting a NACK when decoding the broadcast or multicast physical downlink shared channel is unsuccessful or the downlink response intended for the UE is corrupted or unreadable.

In some cases, as shown at 345, UE 115-*b* may receive a retransmission of the physical downlink shared channel or of the downlink response intended for the UE from base station 105-*b* based at least in part on UE 115-*b* refraining from transmitting an ACK or a NACK within a given time period. In some cases, base station 105-*b* may resend the same transmission again in the retransmission (e.g., same content in the retransmission at 345 as is sent in the transmission at 330). Alternatively, the retransmission at 345 may be different than the transmission at 330 or at least partially different from the transmission at 330. For example, the retransmission at 345 may include in the retransmission at 345 a copy of at least a portion of the content sent in the transmission at 330.

Figure 4:
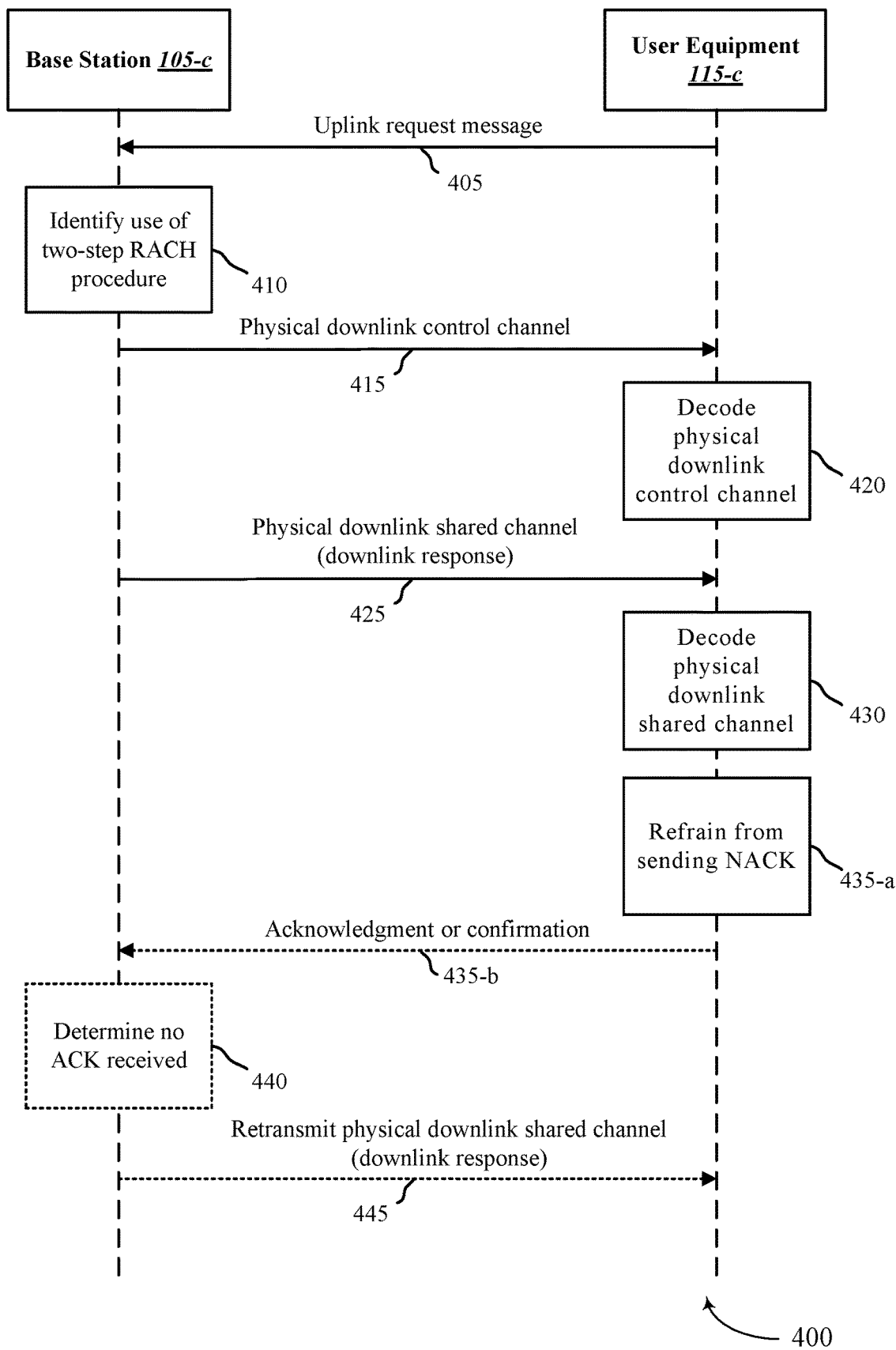
FIG. 4 illustrates an example of a swim diagram that illustrates a wireless communications system that supports message 2 of a two-step random access procedure in accordance with aspects of the present disclosure.

FIG. 4 illustrates an example of a swim diagram 400 that illustrates a wireless communications system that supports message 2 of a two-step random access procedure in accordance with aspects of the present disclosure. In some examples, swim diagram 400 may implement aspects of wireless communication system 100. Swim diagram 400 relates to instances where the message 2 of a two-step random access procedure is included in a physical downlink shared channel message that is intended for a single UE.

As illustrated, process 400 may include UE 115*c* and base station 105-*c*, which may be examples of a UE 115 or a base station 105, as described herein with reference to FIGS. 1-3.

At 405, UE 115*c* may send an uplink request message to base station 105*c* as a first message of a two-step RACH procedure. In some cases, UE 115*c* may determine that UE 115*c* is to use a two-step RACH procedure, where the two-step RACH procedure includes an uplink request message and a downlink response, and then send the uplink request message to base station 105*c* as the first message of the two-step RACH procedure.

At block 410, base station 105*c* may identify that the uplink request message is a first message of the two-step RACH procedure. For example, after receiving the uplink request message from UE 115-*c*, base station 105*c* may analyze the uplink request message and determine from the analysis that the uplink request message is the first message of a two-step RACH procedure.

At 415, base station 105*c* may send a physical downlink control channel to UE 115-*c*. In some cases, the physical downlink control channel may indicate resources of a broadcast or multicast physical downlink shared channel on which a downlink response to the uplink request message may be received at UE 115-*c*. In some cases, base station 105*c* may compute a radio network temporary identifier and use the computed radio network temporary identifier to scramble a CRC of the physical downlink control channel. In some cases, base station 105*c* may include a RAPID and one or more UE indications in the physical downlink control channel. In some cases, a UE indication may point to a full UE identifier. In some cases, base station 105*c* may use a hashing function to create a hash of the full UE identifier, and use the created hash as the UE indication. In some cases, the base station 105*c* may use the UE indication as a replacement for the HARQ process identifier. In some examples, UE 115*c* may attempt to decode a downlink response message after decoding the physical downlink control channel with a UE indication that maps to the UE identifier of UE 115-*c*.

At block 420, UE 115*c* may decode the physical downlink control channel received from base station 105-*c*. In some cases, base station 105*c* may include the UE indication in the physical downlink control channel and UE 115*c* may identify the UE indication in the decoded physical downlink control channel. In one example, the UE indication may include a hash of a complete UE identifier. In some cases, the UE indication may include a hash of both a complete UE identifier and a random access preamble index (RAPID). In some cases, a collision may occur between different UEs with different UE identifiers and RAPID combinations that hash to the same UE indication. For example, UE 115*c* may decode the physical downlink control channel using its UE indication, but because the hash could potentially map to multiple UE indications, the corresponding physical downlink shared channel may or may not relate to this particular UE. In some examples, base station 105*c* may identify potential collisions and send the related downlink response messages at different times to avoid the potential collision. In some cases, a one-to-one relationship may exist between the physical downlink control channel and the physical downlink shared channel for an intended UE (e.g., UE 115-*c*). In some examples, UE 115-*c* may decode a single physical downlink shared channel after decoding physical downlink control channel and checking the UE indication field in the decoded physical downlink control channel. For example, UE 115*c* may analyze the UE indication in the decoded physical downlink control channel and then decode the physical downlink shared channel after determining the UE indication indicates the second message may be intended for UE 115-*c*.

At 425, base station 105*c* may send a physical downlink shared channel to UE 115-*c*. At block 425, UE 115*c* may receive from base station 105*c* a downlink response as a second message of the two-step RACH procedure. In some cases, the downlink response may be received by UE 115*c* on the physical downlink shared channel from base station 105-*c*. In one example, base station 105*c* may configure the physical downlink shared channel to provide the downlink response for a single UE (e.g., UE 115-*c*). In some cases, base station 105*c* may configure a downlink response message to include a complete UE identifier to avoid hashing collision situations. In some examples, the UE with the successful contention resolution may be permitted to send an ACK on the resource indicated in physical downlink control channel. In some cases, UE 115*c* may still be prohibited from sending a NACK in case there is a collision. As a result, UE 115*c* may not know with certainty whether the downlink response message is for UE 115*c* without decoding physical downlink shared channel. However, base station 105*c* may retransmit a downlink response message when an ACK is not received by a specified time.

At block 430, UE 115*c* may decode the physical downlink shared channel. In some cases, UE 115*c* may analyze the UE indication in the decoded physical downlink control channel and decode the physical downlink shared channel after determining the analyzed UE indication indicates the second message is intended for UE 115-*c*. In some cases, UE 115*c* may identify the UE identifier of UE 115*c* in the decoded physical downlink shared channel.

At block 435-*a*, UE 115*c* may refrain from sending a NACK after determining decoding the broadcast or multicast physical downlink shared channel is unsuccessful or the downlink response intended for the UE is corrupted or unreadable. In some cases, UE 115-*c* may trigger base station 105*c* to resend the downlink response by refraining from sending an ACK or NACK within a predetermined time period. In some cases, at 435-*b* UE 115*c* may send an ACK to base station 105*c* upon successfully decoding the physical downlink shared channel.

At block 440, base station 105*c* may determine that UE 115*c* has not sent an ACK to base station 105*c* within the predetermined time period. Upon determining an ACK has not been received from UE 115c within the predetermined time period, base station 105c may configure a retransmission of the downlink response via the broadcast or multicast physical downlink shared channel.

At 445, base station 105c may retransmit the physical downlink shared channel to UE 115-c. In some cases, at 445 base station 105c may send to UE 115c the same, or a duplicate copy of the downlink response that was sent at 425. Alternatively, base station 105c may alter one or more aspects of the downlink response sent at 425 and send UE 115-c the altered downlink response at 445. For example, base station 105c may add to the downlink response at 445 at least one of a random access preamble index (RAPID), timing advance (TA), cell radio network temporary identifier, and/or UE identifier that was not included in the downlink response at 425. Additionally or alternatively, base station 105-c may remove from the downlink response at 445 at least one of a random access preamble index (RAPID), timing advance (TA), cell radio network temporary identifier, and/or UE identifier that was included in the downlink response at 425.

Figure 5:
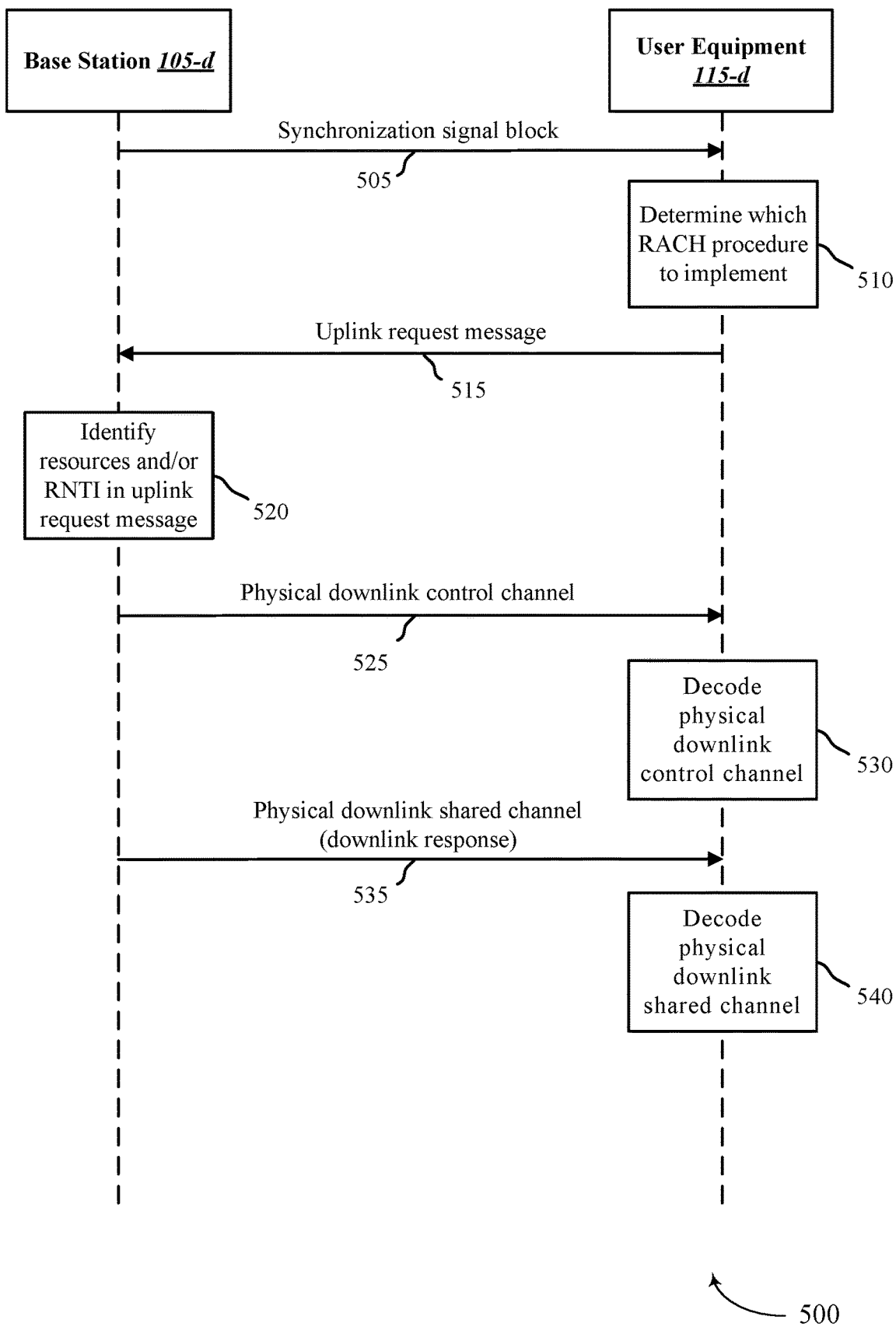
FIG. 5 illustrates an example of a swim diagram that illustrates a wireless communications system that supports message 2 of a two-step random access procedure in accordance with aspects of the present disclosure.

FIG. 5 illustrates an example of a swim diagram 500 that illustrates a wireless communications system that supports message 2 of a two-step random access procedure in accordance with aspects of the present disclosure. In some examples, swim diagram 500 may implement aspects of wireless communication system 100. Swim diagram 500 relates to instances where a UE and a base station may both support two-step random access procedures and four-step random access procedures. Thus, in order to differentiate the signaling for each type of random access procedure, signaling distinctions may be used. For example, different resources or different radio network temporary identifiers may be used, depending on whether the signaling is for a two-step random access procedure or a four-step random access procedure.

As illustrated, process 500 may include UE 115-d and base station 105-d, which may be examples of a UE 115 or a base station 105, as described herein with reference to FIG. 1.

At 505, UE 115-d may receive, via a synchronization signal block (SSB), information regarding uplink resources or a radio network temporary identifier, or both, for a two-step random access channel (RACH) procedure. Additionally or alternatively, UE 115-d may receive, via the SSB, information regarding uplink resources or a radio network temporary identifier, or both, for a four-step RACH procedure. In some cases, the system information (in the form of remaining system information (RMSI)) may indicate a mapping of resources to be used by the UE 115-d to transmit its uplink request message, where the resources used by the UE 115-d may differ based on whether the uplink request message is part of a two-step random access procedure or a four-step random access procedure. Further, in some instances, additional information may be provided by the system information to instruct UE 115-d to use the two-step RACH procedure or to use the four-step RACH procedure to configure and send an uplink request message to the base station (e.g., as a first message in the two-step RACH procedure).

In some cases, for frequency division multiplexing and/or time division multiplexing between the two-step random access procedure and the four-step random access procedure, a radio network temporary identifier (e.g., group random access radio network temporary identifier) for multiple UEs (including UE 115-d) may be different. When the radio network temporary identifiers are different for multiple UEs, a physical downlink shared channel may contain a message only for the four-step random access procedure, or may contain a message only for the two-step random access procedure.

In some cases, with code division multiplexing (e.g., of preamble), for each random access channel occasion base station 105c may allocate some preambles among multiple preambles (e.g., up to 64 preambles total) for the four-step random access procedure and allocate the remaining preambles from the multiple preambles for the two-step random access procedure. In some cases, a preamble portion of the first message in the two-step random access procedure may have the same format and size as the first message from the four-step random access procedure. In some cases, the data portion of the first message from the two-step random access procedure cannot be code division multiplexed with the first message from the four-step random access procedure. In some cases, for code division multiplexing between the two-step physical random access channel (PRACH) and the four-step PRACH, the radio network temporary identifier (e.g., group random access radio network temporary identifier) may be the same for UEs in the same PRACH. In some cases, a physical downlink shared channel may include a mix of second messages from the four-step random access procedure and second message from the two-step random access procedure. In some cases, the second messages from both the four-step random access procedure and two-step random access procedure may be multiplexed in a media access layer of the physical downlink shared channel.

At block 510, UE 115-d may determine whether to use at least one of the uplink resources or the radio network temporary identifier of the two-step RACH procedure to access a network of base station 105-d, or to use at least one of the uplink resources or the radio network temporary identifier of the four-step RACH procedure to access the network. In some cases, UE 115-d may allocate one or more preambles for a two-step RACH occasion of the two-step RACH procedures, and allocate one or more preambles for a four-step RACH occasion of the four-step RACH procedures.

At 515, UE 115-d may transmit an uplink request message to base station 105-d. In some cases, UE 115-d may use at least one of an identified uplink resource or the identified radio network temporary identifier to transmit the uplink request message to base station 105-d. For example, UE 115-d may use the identified uplink resource and/or the identified radio network temporary identifier of the two-step RACH procedure to transmit the first message (e.g., sending an uplink request message as a first message in the two-step RACH procedure), or may use the identified uplink resource and/or the identified radio network temporary identifier of the four-step RACH procedure to transmit the first message.

At block 520, base station 105-d may identify an uplink resource or a radio network temporary identifier used by UE 115-d in transmission of the uplink request message. In some cases, base station 105-d may be configured to support a two-step RACH procedure and/or a four-step RACH procedure. In one example, base station 105-d may determine whether the uplink request message from UE 115-d is part of the two-step RACH procedure or the four-step RACH procedure based at least in part on what uplink resources and/or what radio network temporary identifier was used to transmit the uplink request message.

At 525, base station 105-d may send a physical downlink control channel to UE 115-d. In some cases, the physical downlink control channel may be configured based on the base station 105-*d* determining that the uplink resource and/or the radio network temporary identifier used in the uplink request message from UE 115-*d* is associated with a two-step RACH procedure or a four-step RACH procedure. In some cases, the physical downlink control channel may indicate resources of a broadcast or multicast physical downlink shared channel on which a downlink response to the uplink request message is sent to UE 115-*d*. In some examples, the downlink response may be a second message of the two-step RACH procedure. In some examples, the downlink response may be a message of the four-step RACH procedure. In some examples, the physical downlink shared channel may be configured to provide a downlink response to each of multiple UEs, including UE 115-*d*.

At block 530, after receiving the physical downlink control channel from base station 105-*d*, UE 115-*d* may decode the physical downlink control channel. In some cases, UE 115-*d* may determine a group random access radio network temporary identifier and decode the physical downlink control channel based at least in part on the determined group random access radio network temporary identifier. In some cases, UE 115-*d* may receive the group random access radio network temporary identifier from base station 105-*d* (e.g., in a SSB from base station 105-*d*).

At 535, base station 105-*d* may send a downlink response to UE 115-*d* via the broadcast or multicast physical downlink shared channel. In some cases, base station 105-*d* may configure the downlink response based on the RACH procedure UE 115-*d* used to transmit the uplink request message. In one example, base station 105-*d* may include in the response to UE 115-*d* either a message for the two-step RACH procedure or a message for the four-step RACH procedure based on which RACH procedure UE 115-*d* used to transmit the uplink request message. In some cases, base station 105-*d* may multiplex a random access response (RAR) for the two-step RACH procedure with a RAR for the four-step RACH procedure and send the multiplexed RARs to UE 115-*d* in the downlink response.

At block 540, UE 115-*d* may decode the physical downlink shared channel in order to determine that the physical downlink shared channel includes the downlink response intended for UE 115-*d*. In one example, UE 115-*d* may determine that the downlink response to UE 115-*d* and each of the additional downlink responses for additional UEs included within the physical downlink shared channel are multiplexed together at a media access control layer. In some cases, UE 115-*d* may use the four-step RACH procedure when UE 115-*d* selects two-step RACH procedure at 510 and then decoding of the downlink response associated with the two-step RACH procedure fails at 540.

Figure 6:
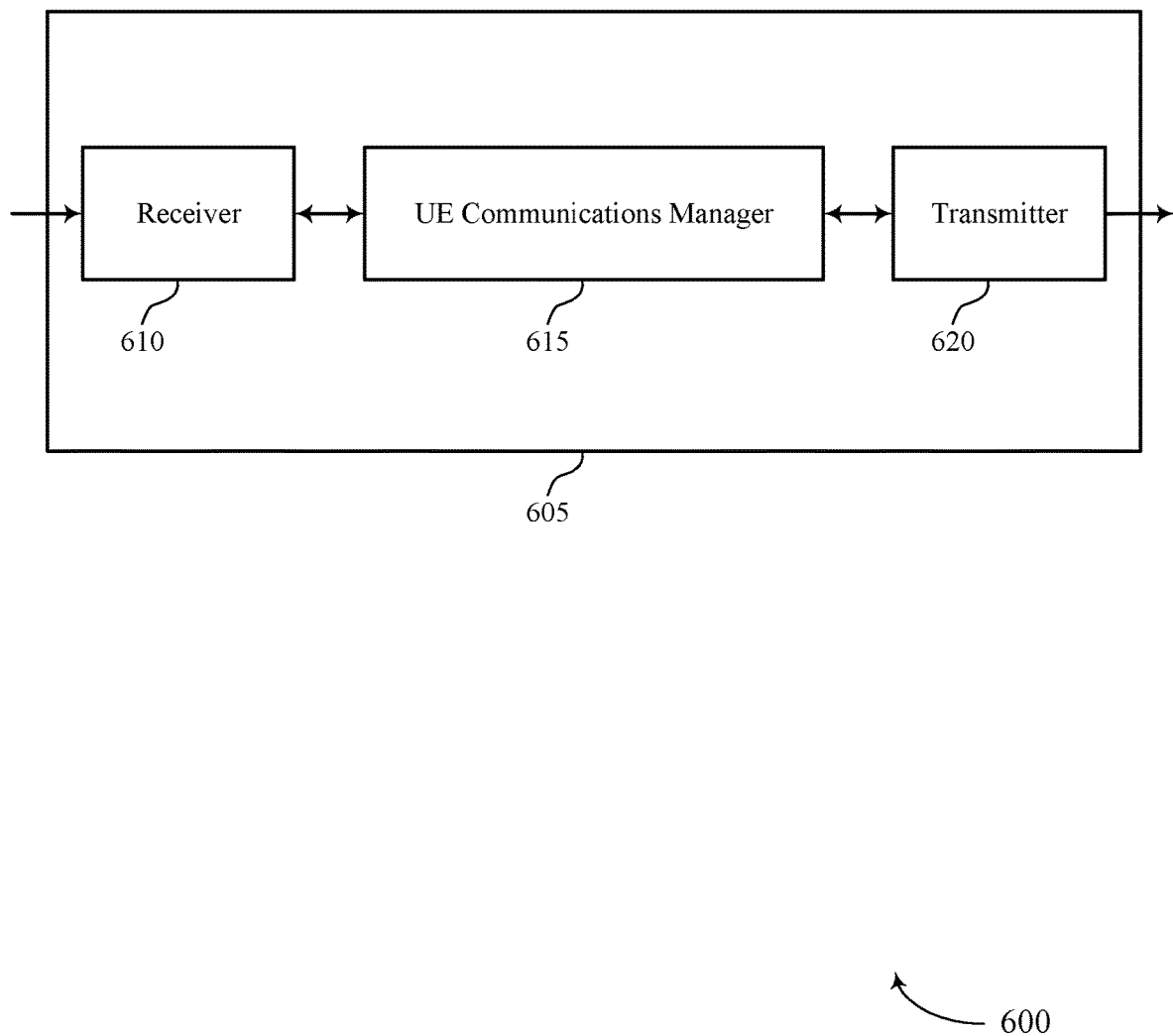
FIGS. 6 and 7 show block diagrams of devices that support message 2 of a two-step random access procedure in accordance with aspects of the present disclosure.

FIG. 6 shows a block diagram 600 of a device 605 that supports message 2 of a two-step random access procedure in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to message 2 of a two-step random access procedure, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may identify that the UE is to use a two-step RACH procedure, the two-step RACH procedure including an uplink request message and a downlink response, send, as a first message of the two-step RACH procedure, the uplink request message to a base station, receive, from the base station, a physical downlink control channel comprising an indication of resources of a broadcast or multicast physical downlink shared channel on which the downlink response is to be received, the physical downlink shared channel being configured to provide downlink responses for multiple UEs, and receive the downlink response from the base station on the broadcast or multicast physical downlink shared channel, the downlink response being a second message of the two-step RACH procedure. The UE communications manager 615 may also identify that the UE is to use a two-step RACH procedure, the two-step RACH procedure including an uplink request message and a downlink response, send, as a first message of the two-step RACH procedure, the uplink request message to a base station, receive, from the base station, a physical downlink control channel comprising an indication of resources of a broadcast or multicast physical downlink shared channel on which the downlink response is to be received, the physical downlink shared channel being configured to provide downlink responses for a single UE, and receive the downlink response from the base station on the broadcast or multicast physical downlink shared channel, the downlink response being a second message of the two-step RACH procedure. The UE communications manager 615 may also determine whether to use a two-step RACH procedure or a four-step RACH procedure to access a network, identify, based on the determining, an uplink resource and a radio network temporary identifier to be used for transmission of a first message of either the two-step RACH procedure or the four-step RACH procedure, at least one of the identified uplink resource or the identified radio network temporary identifier being indicative of whether the UE is using the two-step RACH procedure or the four-step RACH procedure, and transmit the first message using the identified uplink resource or the identified radio network temporary identifier. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
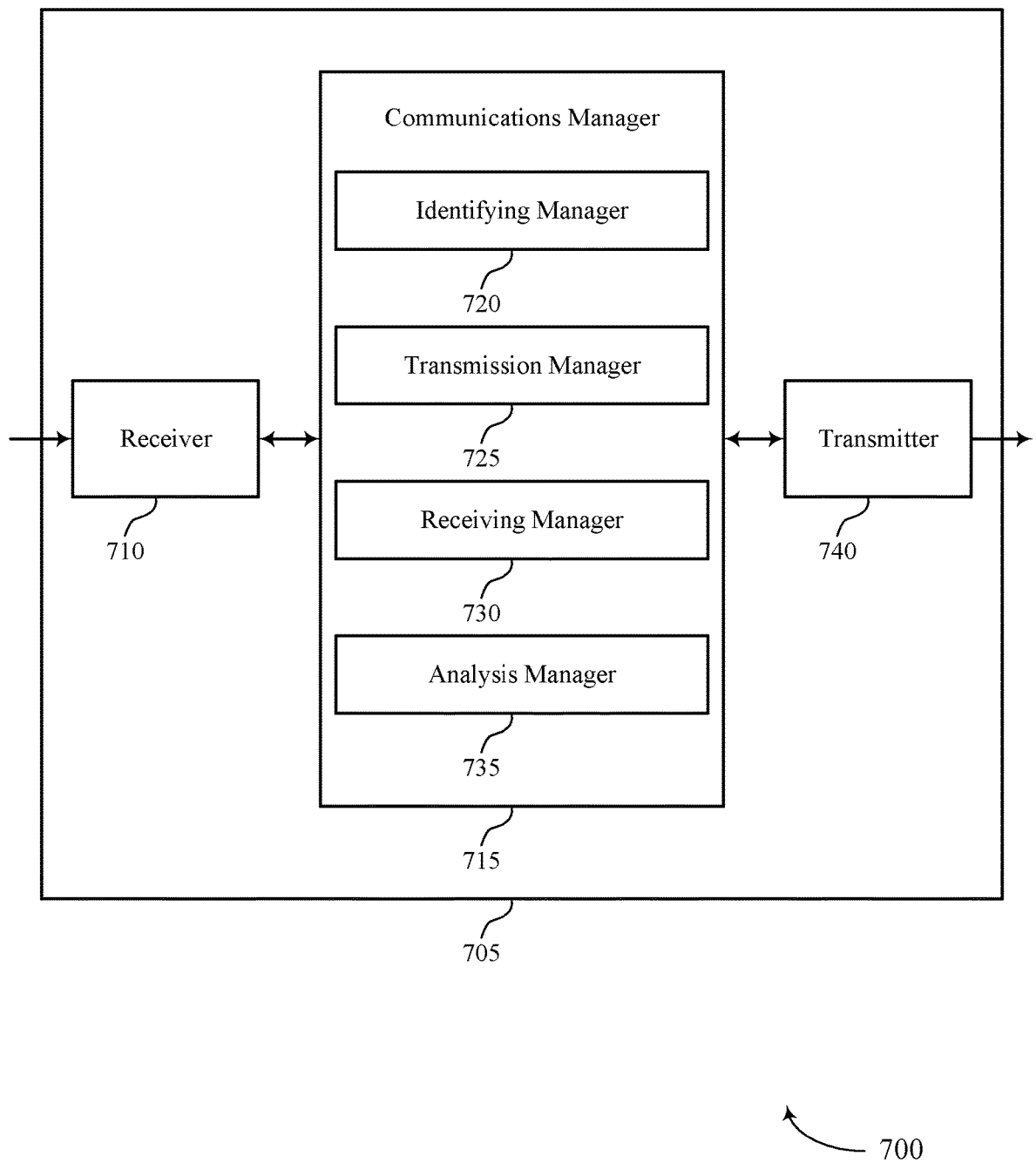

FIG. 7 shows a block diagram 700 of a device 705 that supports message 2 of a two-step random access procedure in accordance with aspects of the present disclosure. The device 705 may be an example of aspects of a device 605, or a UE 115 as described herein. The device 705 may include a receiver 710, a UE communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to message 2 of a two-step random access procedure, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include an identifying manager 720, a transmission manager 725, a receiving manager 730, and an analysis manager 735. The UE communications manager 715 may be an example of aspects of the UE communications manager 910 described herein.

When the UE supports a two-step random access procedure where HARQ feedback and retransmission are optionally supported or not supported and where downlink response messages are multiplexed in a single broadcasted physical downlink shared channel, the identifying manager 720 may identify that the UE is to use a two-step RACH procedure, the two-step RACH procedure including an uplink request message and a downlink response. The transmission manager 725 may send, as a first message of the two-step RACH procedure, the uplink request message to a base station. The receiving manager 730 may receive, from the base station, a physical downlink control channel comprising an indication of resources of a broadcast or multicast physical downlink shared channel on which the downlink response is to be received, the physical downlink shared channel being configured to provide downlink responses for multiple UEs and receive the downlink response from the base station on the broadcast or multicast physical downlink shared channel, the downlink response being a second message of the two-step RACH procedure.

When the UE supports a two-step random access procedure where HARQ feedback and retransmission are supported and downlink response messages are sent separately in unicast broadcasted physical downlink shared channels, the identifying manager 720 may identify that the UE is to use a two-step RACH procedure, the two-step RACH procedure including an uplink request message and a downlink response. The transmission manager 725 may send, as a first message of the two-step RACH procedure, the uplink request message to a base station. The receiving manager 730 may receive, from the base station, a physical downlink control channel comprising an indication of resources of a broadcast or multicast physical downlink shared channel on which the downlink response is to be received, the physical downlink shared channel being configured to provide downlink responses for a single UE and receive the downlink response from the base station on the broadcast or multicast physical downlink shared channel, the downlink response being a second message of the two-step RACH procedure.

In cases where system information indicates two sets of resources for physical random access channel (PRACH) and where the system information may instruct each UE to use either the two-step random access procedure or the four-step random access procedure, the analysis manager 735 may determine whether to use a two-step RACH procedure or a four-step RACH procedure to access a network. The identifying manager 720 may identify, based on the determining, an uplink resource and a radio network temporary identifier to be used for transmission of a first message of either the two-step RACH procedure or the four-step RACH procedure, at least one of the identified uplink resource or the identified radio network temporary identifier being indicative of whether the UE is using the two-step RACH procedure or the four-step RACH procedure. The transmission manager 725 may transmit the first message using the identified uplink resource or the identified radio network temporary identifier.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
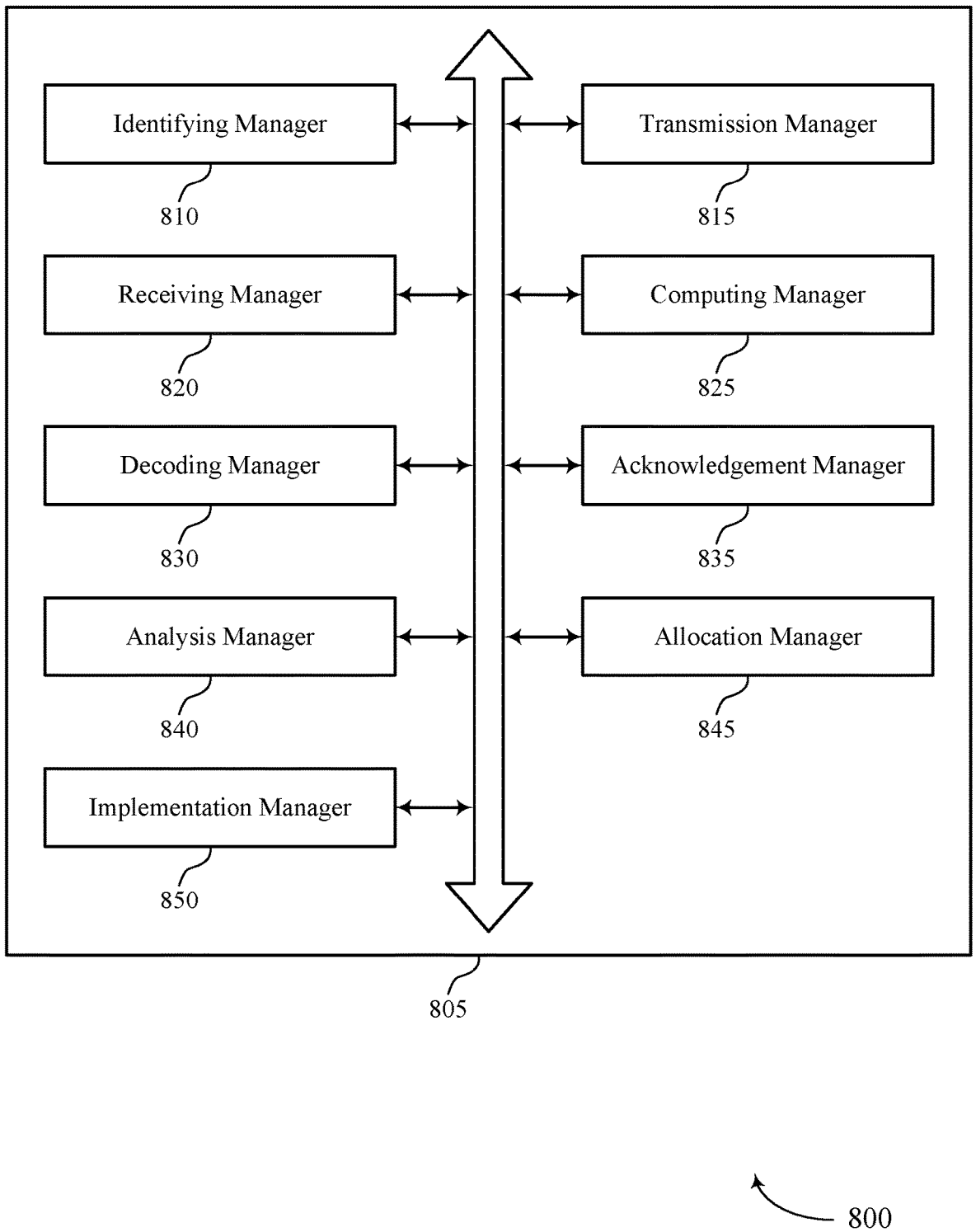
FIG. 8 shows a block diagram of a communications manager that supports message 2 of a two-step random access procedure in accordance with aspects of the present disclosure.

FIG. 8 shows a block diagram 800 of a UE communications manager 805 that supports message 2 of a two-step random access procedure in accordance with aspects of the present disclosure. The UE communications manager 805 may be an example of aspects of a UE communications manager 615, a UE communications manager 715, or a UE communications manager 910 described herein. The UE communications manager 805 may include an identifying manager 810, a transmission manager 815, a receiving manager 820, a computing manager 825, a decoding manager 830, an acknowledgement manager 835, an analysis manager 840, an allocation manager 845, and an implementation manager 850. Each of these modules may communicate, directly or indirectly, with one another (e.g., via one or more buses).

When the UE supports a two-step random access procedure where HARQ feedback and retransmission are optionally supported or not supported and where downlink response messages are multiplexed in a single broadcasted physical downlink shared channel, the identifying manager 810 may identify that the UE is to use a two-step RACH procedure, the two-step RACH procedure including an uplink request message and a downlink response.

In cases where HARQ feedback and retransmission are supported or not supported, the identifying manager 810 may identify that downlink responses for multiple UEs included within the broadcast or multicast physical downlink shared channel are multiplexed at a media access control layer, where the downlink response intended for the UE is one of the multiplexed downlink responses.

In cases where HARQ feedback and retransmission are not supported, the identifying manager 810 may identify an uplink grant in the downlink response intended for the UE, the uplink grant indicating resources for transmission by the UE of a confirmation message that confirms the UE received the downlink response intended for the UE or the broadcast or multicast physical downlink shared channel.

In cases where HARQ feedback and retransmission are supported or not supported, the transmission manager 815 may send, as a first message of the two-step RACH procedure, the uplink request message to a base station.

In cases where HARQ feedback and retransmission are supported, the transmission manager 815 may send an ACK to the base station after successfully decoding the broadcast or multicast physical downlink shared channel and after identifying the downlink response intended for the UE.

In cases where HARQ feedback and retransmission are supported, the transmission manager 815 may transmit the ACK using resources identified by a combination of the acknowledgement resource indicator included in the physical downlink control channel and an additional acknowledgement resource indicator included in the downlink response intended for the UE. In some examples, the transmission manager 815 may transmit the confirmation message based on the uplink grant.

In cases where HARQ feedback and retransmission are supported or not supported, the receiving manager 820 may receive, from the base station, a physical downlink control channel comprising an indication of resources of a broadcast or multicast physical downlink shared channel on which the downlink response is to be received, the physical downlink shared channel being configured to provide downlink responses for multiple UEs.

In cases where HARQ feedback and retransmission are supported or not supported, the receiving manager 820 may receive the downlink response from the base station on the broadcast or multicast physical downlink shared channel, the downlink response being a second message of the two-step RACH procedure.

In cases where HARQ feedback and retransmission are supported, the receiving manager 820 may receive, based on refraining from transmitting a NACK, a retransmission of the downlink response intended for the UE.

In cases where HARQ feedback and retransmission are supported or not supported, the computing manager 825 may determine a group random access radio network temporary identifier. The decoding manager 830 may decode the physical downlink control channel based on the group random access radio network temporary identifier.

In cases where HARQ feedback and retransmission are not supported, the decoding manager 830 may decode the broadcast or multicast physical downlink shared channel in accordance with the indication received on the physical downlink control channel.

In cases where HARQ feedback and retransmission are supported, the decoding manager 830 may refrain from transmitting any HARQ feedback with respect to decoding the physical downlink control channel or decoding the broadcast or multicast physical downlink shared channel. The acknowledgement manager 835 may refrain from transmitting a NACK when decoding the broadcast or multicast physical downlink shared channel is unsuccessful or the downlink response intended for the UE is corrupted or unreadable.

When the UE supports a two-step random access procedure where HARQ feedback and retransmission are supported and downlink response messages are multiplexed in a single physical downlink shared channel, in some examples, the identifying manager 810 may identify that the UE is to use a two-step RACH procedure, the two-step RACH procedure including an uplink request message and a downlink response. In some examples, the identifying manager 810 may identify a UE indication in the decoded physical downlink control channel, the UE indication including a hash of a UE identifier.

In some examples, the identifying manager 810 may identify the UE identifier in the decoded physical downlink shared channel. In some examples, the transmission manager 815 may send, as a first message of the two-step RACH procedure, the uplink request message to a base station. In some examples, the transmission manager 815 may send an ACK to the base station on a resource indicated in the decoded physical downlink control channel after successful contention resolution determined by successfully decoding the physical downlink shared channel.

In some examples, the receiving manager 820 may receive, from the base station, a physical downlink control channel comprising an indication of resources of a broadcast or multicast physical downlink shared channel on which the downlink response is to be received, the physical downlink shared channel being configured to provide downlink responses for a single UE.

In some examples, the receiving manager 820 may receive the downlink response from the base station on the broadcast or multicast physical downlink shared channel, the downlink response being a second message of the two-step RACH procedure. In some examples, the analysis manager 840 may analyze the UE indication in the decoded physical downlink control channel.

In some examples, the decoding manager 830 may decode the physical downlink control channel. In some examples, the decoding manager 830 may decode the physical downlink shared channel after determining the UE indication indicates the second message is intended for the UE.

In some examples, the acknowledgement manager 835 may trigger the base station to resend the downlink response by failing to send an ACK within a set time period.

When the UE supports a two-step random access procedure where HARQ feedback and retransmission are supported and downlink response messages are sent separately in unicast broadcasted physical downlink shared channels, in some examples, the identifying manager 810 may identify, based on the determining, an uplink resource and a radio network temporary identifier to be used for transmission of a first message of either the two-step RACH procedure or the four-step RACH procedure, at least one of the identified uplink resource or the identified radio network temporary identifier being indicative of whether the UE is using the two-step RACH procedure or the four-step RACH procedure.

In some examples, the transmission manager 815 may transmit the first message using the identified uplink resource or the identified radio network temporary identifier.

In some examples, the receiving manager 820 may receive system information comprising an indication of a resource mapping between a synchronization signal burst and uplink resources for either the two-step RACH procedure or the four-step RACH procedure, where the identified uplink resource is one of the uplink resources identified by the resource mapping. In some examples, the receiving manager 820 may receive information from a base station regarding whether the UE is to use the two-step RACH procedure or the four-step RACH procedure.

The analysis manager 840 may determine whether to use a two-step RACH procedure or a four-step RACH procedure to access a network. The allocation manager 845 may allocate one or more preambles for a two-step RACH occasion of the two-step RACH procedure. In some examples, the allocation manager 845 may allocate one or more preambles for a four-step RACH occasion of the four-step RACH procedure.

The implementation manager 850 may use the four-step RACH procedure when decoding of a message associated with the two-step RACH procedure fails, where a synchronization signal block is mapped to a first set of resources of the two-step RACH procedure and to a second set of resources for the four-step RACH procedure.

Figure 9:
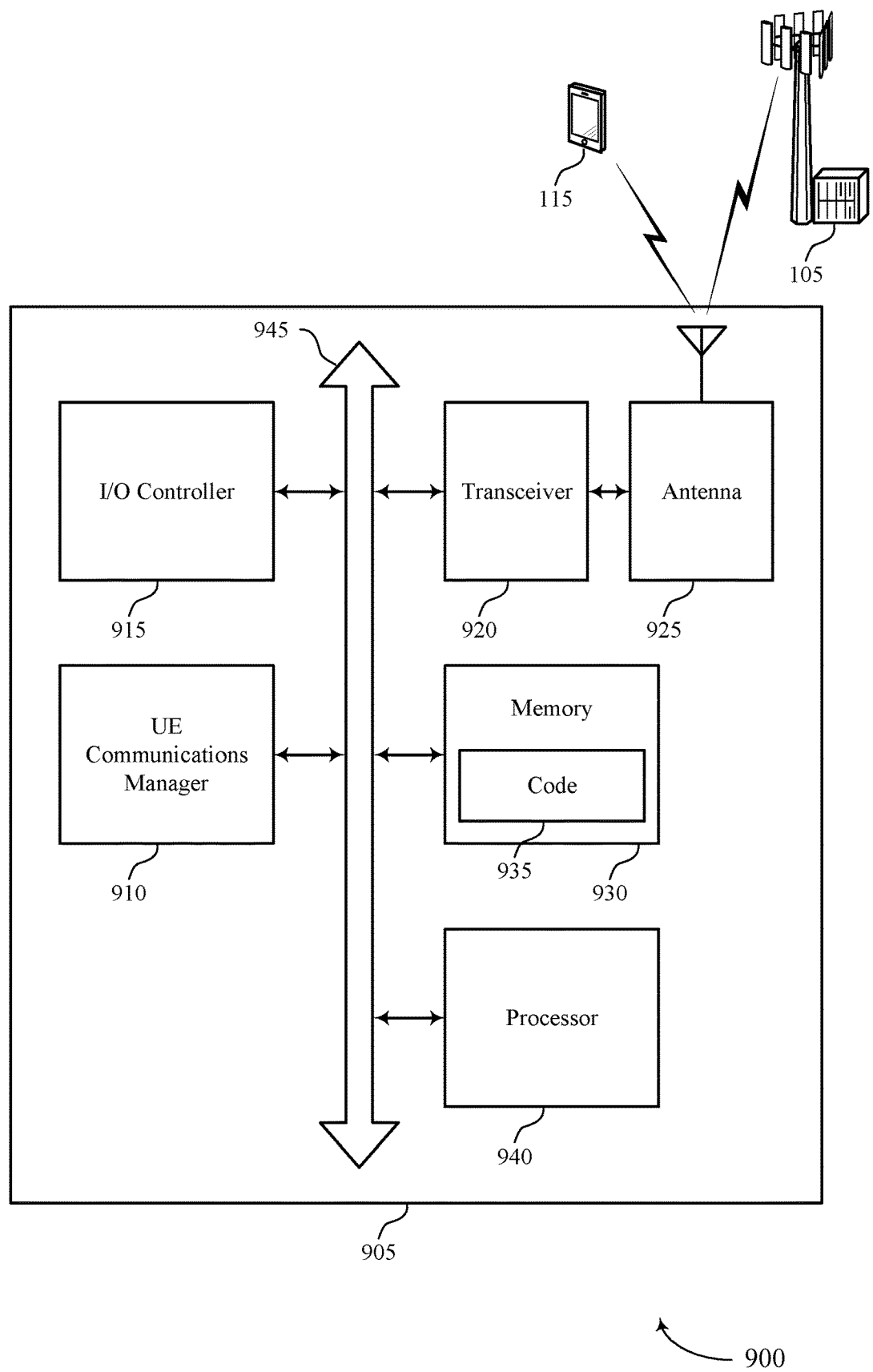
FIG. 9 shows a diagram of a system including a device that supports message 2 of a two-step random access procedure in accordance with aspects of the present disclosure.

FIG. 9 shows a diagram of a system 900 including a device 905 that supports message 2 of a two-step random access procedure in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may identify that the UE is to use a two-step RACH procedure, the two-step RACH procedure including an uplink request message and a downlink response, send, as a first message of the two-step RACH procedure, the uplink request message to a base station, receive, from the base station, a physical downlink control channel comprising an indication of resources of a broadcast or multicast physical downlink shared channel on which the downlink response is to be received, the physical downlink shared channel being configured to provide downlink responses for multiple UEs, and receive the downlink response from the base station on the broadcast or multicast physical downlink shared channel, the downlink response being a second message of the two-step RACH procedure. The UE communications manager 910 may also identify that the UE is to use a two-step RACH procedure, the two-step RACH procedure including an uplink request message and a downlink response, send, as a first message of the two-step RACH procedure, the uplink request message to a base station, receive, from the base station, a physical downlink control channel comprising an indication of resources of a broadcast or multicast physical downlink shared channel on which the downlink response is to be received, the physical downlink shared channel being configured to provide downlink responses for a single UE, and receive the downlink response from the base station on the broadcast or multicast physical downlink shared channel, the downlink response being a second message of the two-step RACH procedure. The UE communications manager 910 may also determine whether to use a two-step RACH procedure or a four-step RACH procedure to access a network, identify, based on the determining, an uplink resource and a radio network temporary identifier to be used for transmission of a first message of either the two-step RACH procedure or the four-step RACH procedure, at least one of the identified uplink resource or the identified radio network temporary identifier being indicative of whether the UE is using the two-step RACH procedure or the four-step RACH procedure, and transmit the first message using the identified uplink resource or the identified radio network temporary identifier.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting message 2 of a two-step random access procedure).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
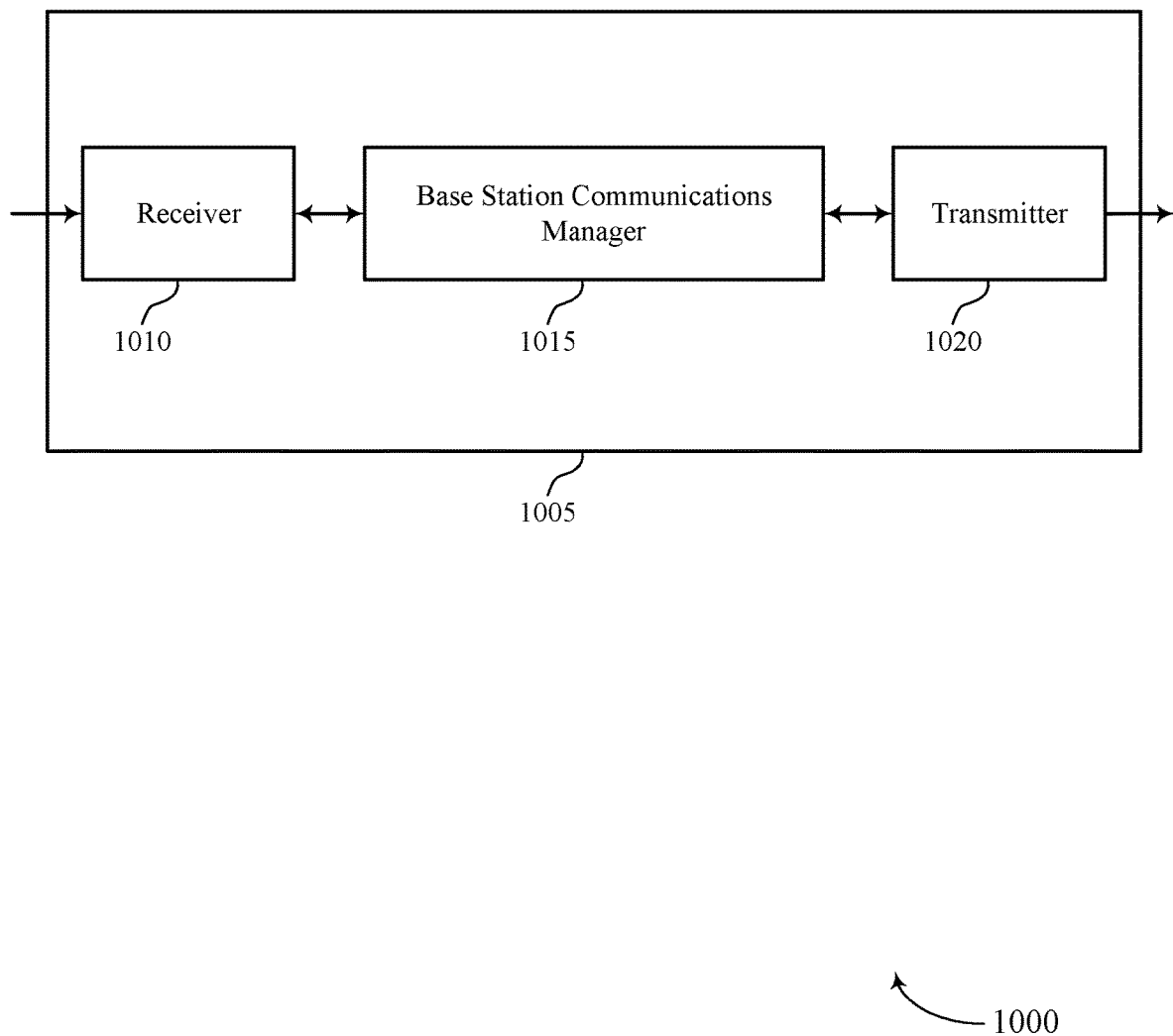
FIGS. 10 and 11 show block diagrams of devices that support message 2 of a two-step random access procedure in accordance with aspects of the present disclosure.

FIG. 10 shows a block diagram 1000 of a device 1005 that supports message 2 of a two-step random access procedure in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to message 2 of a two-step random access procedure, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may receive an uplink request message from a UE, identify that the uplink request message is a first message of a two-step RACH procedure, send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE, and send the plurality of downlink responses, including the downlink response intended for the UE, to the multiple UEs via the broadcast or multicast physical downlink shared channel. The base station communications manager 1015 may also receive an uplink request message from a UE, identify that the uplink request message is a first message of a two-step RACH procedure, send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide the downlink response for a single UE (e.g., only a single UE), and send the downlink response to the UE via the broadcast or multicast physical downlink shared channel. The base station communications manager 1015 may also identify that the base station is configured to support both a two-step RACH procedure or a four-step RACH procedure, identify an uplink resource and a radio network temporary identifier used by the UE in transmission of the uplink request message, receive an uplink request message from a UE, the uplink request message being a first message of either the two-step RACH procedure or the four-step RACH procedure, determine whether the uplink request message is part of the two-step RACH procedure or the four-step RACH procedure based on at least one of the uplink resource or the radio network temporary identifier associated with the uplink request message, and respond to the UE in accordance with whether the uplink request message is part of the two-step RACH procedure or the four-step RACH procedure. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
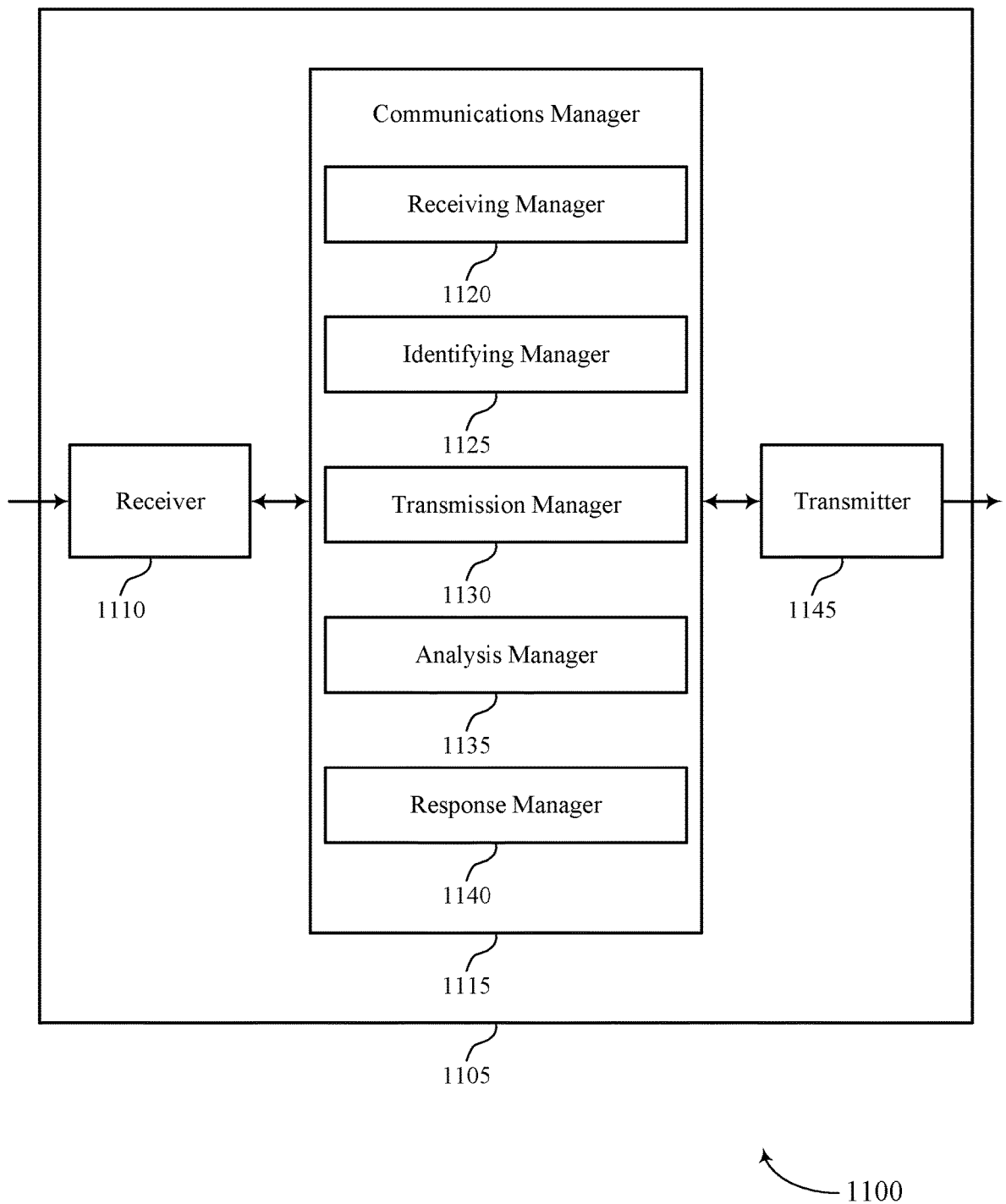

FIG. 11 shows a block diagram 1100 of a device 1105 that supports message 2 of a two-step random access procedure in accordance with aspects of the present disclosure. The device 1105 may be an example of aspects of a device 1005, or a base station 105 as described herein. The device 1105 may include a receiver 1110, a base station communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to message 2 of a two-step random access procedure, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a receiving manager 1120, an identifying manager 1125, a transmission manager 1130, an analysis manager 1135, and a response manager 1140. The base station communications manager 1115 may be an example of aspects of the base station communications manager 1310 described herein.

When the base station supports a two-step random access procedure where HARQ feedback and retransmission are supported or not supported and where downlink response messages are multiplexed in a single broadcasted physical downlink shared channel, the receiving manager 1120 may receive an uplink request message from a UE. The identifying manager 1125 may identify that the uplink request message is a first message of a two-step RACH procedure. The transmission manager 1130 may send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE and send the plurality of downlink responses, including the downlink response intended for the UE, to the multiple UEs via the broadcast or multicast physical downlink shared channel.

When the base station supports a two-step random access procedure where HARQ feedback and retransmission are supported and downlink response messages are sent separately in unicast broadcasted physical downlink shared channels, the receiving manager 1120 may receive an uplink request message from a UE. The identifying manager 1125 may identify that the uplink request message is a first message of a two-step RACH procedure. The transmission manager 1130 may send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide the downlink response for a single UE (e.g., only a single UE) and send the downlink response to the UE via the broadcast or multicast physical downlink shared channel.

In cases where system information indicates two sets of resources for physical random access channel (PRACH) and where the system information may instruct each UE to use either the two-step random access procedure or the four-step random access procedure, the identifying manager 1125 may identify that the base station is configured to support both a two-step RACH procedure or a four-step RACH procedure and identify an uplink resource and a radio network temporary identifier used by the UE in transmission of the uplink request message. The receiving manager 1120 may receive an uplink request message from a UE, the uplink request message being a first message of either the two-step RACH procedure or the four-step RACH procedure. The analysis manager 1135 may determine whether the uplink request message is part of the two-step RACH procedure or the four-step RACH procedure based on at least one of the uplink resource or the radio network temporary identifier associated with the uplink request message. The response manager 1140 may respond to the UE in accordance with whether the uplink request message is part of the two-step RACH procedure or the four-step RACH procedure.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
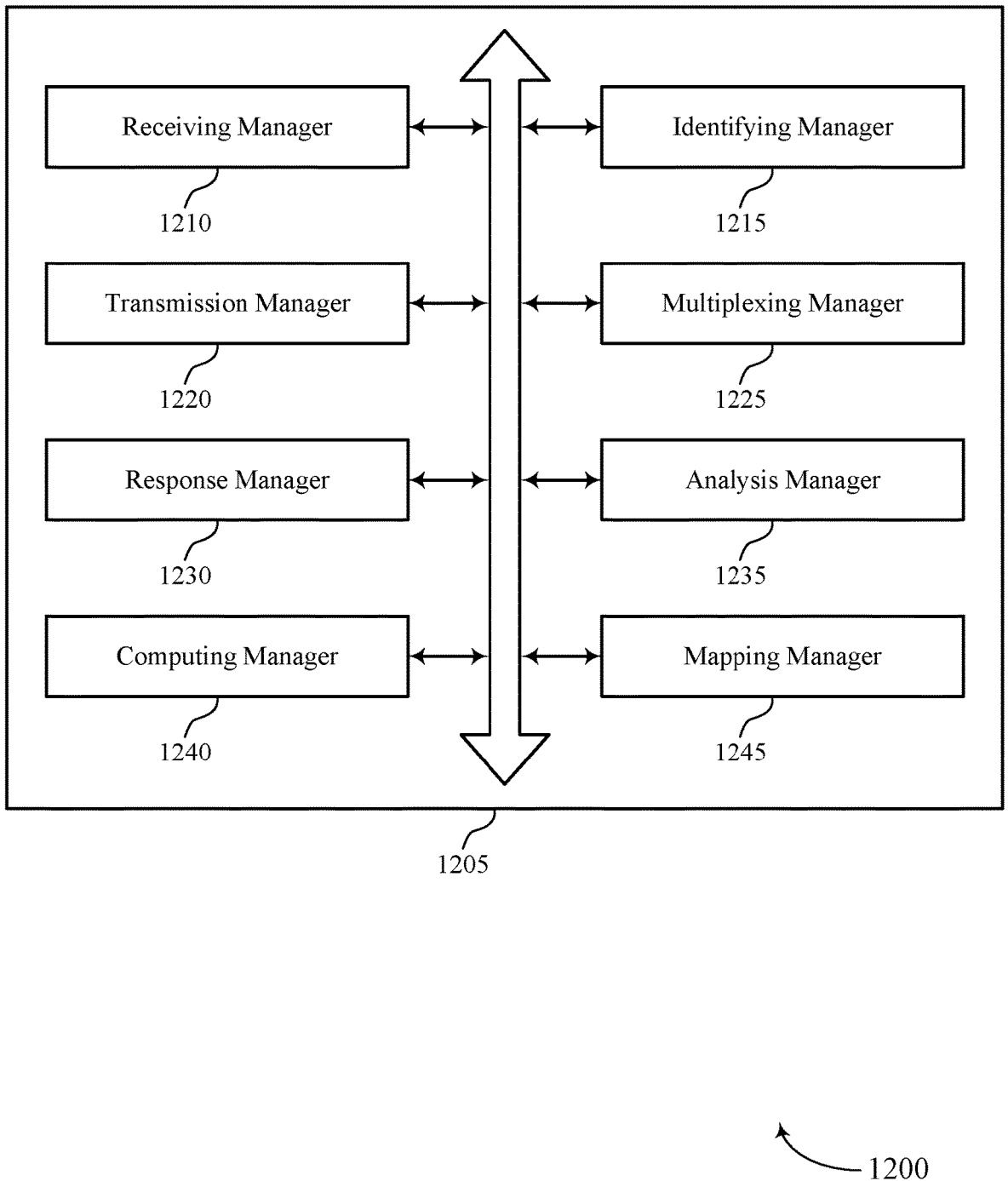
FIG. 12 shows a block diagram of a communications manager that supports message 2 of a two-step random access procedure in accordance with aspects of the present disclosure.

FIG. 12 shows a block diagram 1200 of a base station communications manager 1205 that supports message 2 of a two-step random access procedure in accordance with aspects of the present disclosure. The base station communications manager 1205 may be an example of aspects of a base station communications manager 1015, a base station communications manager 1115, or a base station communications manager 1310 described herein. The base station communications manager 1205 may include a receiving manager 1210, an identifying manager 1215, a transmission manager 1220, a multiplexing manager 1225, a response manager 1230, an analysis manager 1235, a computing manager 1240, and a mapping manager 1245. Each of these modules may communicate, directly or indirectly, with one another (e.g., via one or more buses).

When the base station supports a two-step random access procedure where HARQ feedback and retransmission are supported or not supported and where downlink response messages are multiplexed in a single broadcasted physical downlink shared channel, the receiving manager 1210 may receive an uplink request message from a UE. The identifying manager 1215 may identify that the uplink request message is a first message of a two-step RACH procedure. The transmission manager 1220 may send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE. In some examples, the transmission manager 1220 may send the plurality of downlink responses, including the downlink response intended for the UE, to the multiple UEs via the broadcast or multicast physical downlink shared channel.

In cases where HARQ feedback and retransmission are supported or not supported, the response manager 1230 may scramble a CRC of the physical downlink control channel by group random access radio network temporary identifier (RA-RNTI).

In cases where HARQ feedback and retransmission are not supported, the multiplexing manager 1225 may multiplex at a media access control layer of the broadcast or multicast physical downlink shared channel the downlink responses for the plurality of UEs, where the downlink response intended for the UE is one of the multiplexed downlink responses.

In cases where HARQ feedback and retransmission are not supported, the response manager 1230 may include an uplink grant in the second message of the physical downlink control channel, the uplink grant indicating resources for transmission by the UE of a confirmation message that confirms the UE received the downlink response intended for the UE or the broadcast or multicast physical downlink shared channel. In some examples, the analysis manager 1235 may confirm the UE receives the second message based on detecting a transmission of the uplink grant.

In cases where HARQ feedback and retransmission are not supported, the response manager 1230 may use a space created by the refraining for (e.g., in the physical downlink control channel) transport block (TB) scaling.

In cases where HARQ feedback and retransmission are not supported, the response manager 1230 may refrain from including in the physical downlink control channel at least one of high availability resolution queue (HARQ) process identifier, new data indicator (NDI), and redundancy version identifier (RVID), or any combination thereof.

In cases where HARQ feedback and retransmission are supported, the response manager 1230 may include in the physical downlink control channel at least one of new data indicator (NDI), and redundancy version identifier (RVID) for retransmission support.

In cases where HARQ feedback and retransmission are supported, the transmission manager 1220 may send to the multiple UEs via the broadcast or multicast physical downlink shared channel a retransmission of the physical downlink shared channel.

In cases where HARQ feedback and retransmission are supported, the transmission manager 1220 may send the retransmission after failing to receive an ACK from any of the multiple UEs within a given time period.

In cases where HARQ feedback and retransmission are supported or not supported, the response manager 1230 may include in each of the multiple downlink responses at least one of random access preamble index (RAPID), timing advance (TA), cell radio network temporary identifier, and UE identifier, or any combination thereof.

In cases where HARQ feedback and retransmission are supported, the response manager 1230 may include in the broadcast or multicast physical downlink shared channel an acknowledgement/negative acknowledgement (ACK/NACK) resource indicator (ARI) for each of the plurality of downlink responses to indicate separate ACK/NACK feedback resources for each RAPID.

In cases where HARQ feedback and retransmission are supported, the response manager 1230 may clear (e.g., toggle) a new data indicator (NDI).

In cases where HARQ feedback and retransmission are supported, the response manager 1230 may include in the retransmission of the downlink response at least one of the second message from the multiple downlink responses, at least one modified message sent previously in the transmission of the downlink response, or at least one new message transmitted for the first time in the retransmission, or any combination thereof.

When the base station supports a two-step random access procedure where HARQ feedback and retransmission are supported and downlink response messages are sent separately in unicast broadcasted physical downlink shared channels, the receiving manager 1210 may receive an uplink request message from a UE. In some examples, the identifying manager 1215 may identify that the uplink request message is a first message of a two-step RACH procedure. In some examples, the transmission manager 1220 may send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide the downlink response for a single UE (e.g., only a single UE). In some examples, the transmission manager 1220 may send the downlink response to the UE via the broadcast or multicast physical downlink shared channel.

In some examples, the transmission manager 1220 may send to the UE via the broadcast or multicast physical downlink shared channel a retransmission of the downlink response as originally transmitted after failing to receive an ACK from the UE within a set time period. In some examples, the response manager 1230 may refrain from retransmitting the downlink response after receiving from the UE an ACK within a set time period.

In some examples, the response manager 1230 may include in the physical downlink control channel a UE indication that includes a hash of a UE identifier and a random access preamble index (RAPID) combination of the UE. In some examples, the response manager 1230 may include in the second message a UE identifier that maps to the hash. In some examples, the response manager 1230 may use the UE identifier to replace the HARQ process identifier.

In some examples, the response manager 1230 may withhold transmission of a downlink response to a second UE when the UE identifier and RAPID combination of the UE and UE identifier and RAPID combination of the second UE both hash to the UE indication.

In cases where system information indicates two sets of resources for physical random access channel (PRACH) and where the system information may instruct each UE to use either the two-step random access procedure or the four-step random access procedure, the receiving manager 1210 may receive an uplink request message from a UE, the uplink request message being a first message of either the two-step RACH procedure or the four-step RACH procedure. In some examples, the identifying manager 1215 may identify that the base station is configured to support both a two-step RACH procedure or a four-step RACH procedure. In some examples, the identifying manager 1215 may identify an uplink resource and a radio network temporary identifier used by the UE in transmission of the uplink request message. The analysis manager 1235 may determine whether the uplink request message is part of the two-step RACH procedure or the four-step RACH procedure based on at least one of the uplink resource or the radio network temporary identifier associated with the uplink request message. The response manager 1230 may respond to the UE in accordance with whether the uplink request message is part of the two-step RACH procedure or the four-step RACH procedure.

In some examples, the multiplexing manager 1225 may multiplex, in the response to the UE, a random access response (RAR) for the two-step RACH procedure with a RAR for the four-step RACH procedure. In some examples, the response manager 1230 may configure the RAR for the two-step RACH procedure to differ from the RAR for the four-step RACH procedure in at least one aspect.

The computing manager 1240 may compute a first radio network temporary identifier for the two-step RACH procedure and a second radio network temporary identifier for the four-step RACH procedure different from the first radio network temporary identifier.

In some examples, the response manager 1230 may include in the response to the UE either a message for two-step RACH procedure or a message for four-step RACH procedure based on whether the uplink request message is part of the two-step RACH procedure or the four-step RACH procedure. In some examples, the response manager 1230 may include in the response to the UE a first preamble for the first radio network temporary identifier and a second preamble for the second radio network temporary identifier.

In some examples, the response manager 1230 may configure both the two-step RACH procedure and the four-step RACH procedure at the same time. The mapping manager 1245 may map a synchronization signal block to a first set of resources of the two-step RACH procedure and to a second set of resources for the four-step RACH procedure.

In some examples, the response manager 1230 may configure system information to indicate the first set of resources for a physical random access channel (PRACH) of the two-step RACH procedure and indicate the second set of resources for a PRACH of the four-step RACH procedure. In some examples, the response manager 1230 may configure frequency domain PRACH resources for the two-step RACH procedure and the resources of the four-step RACH procedure.

Figure 13:
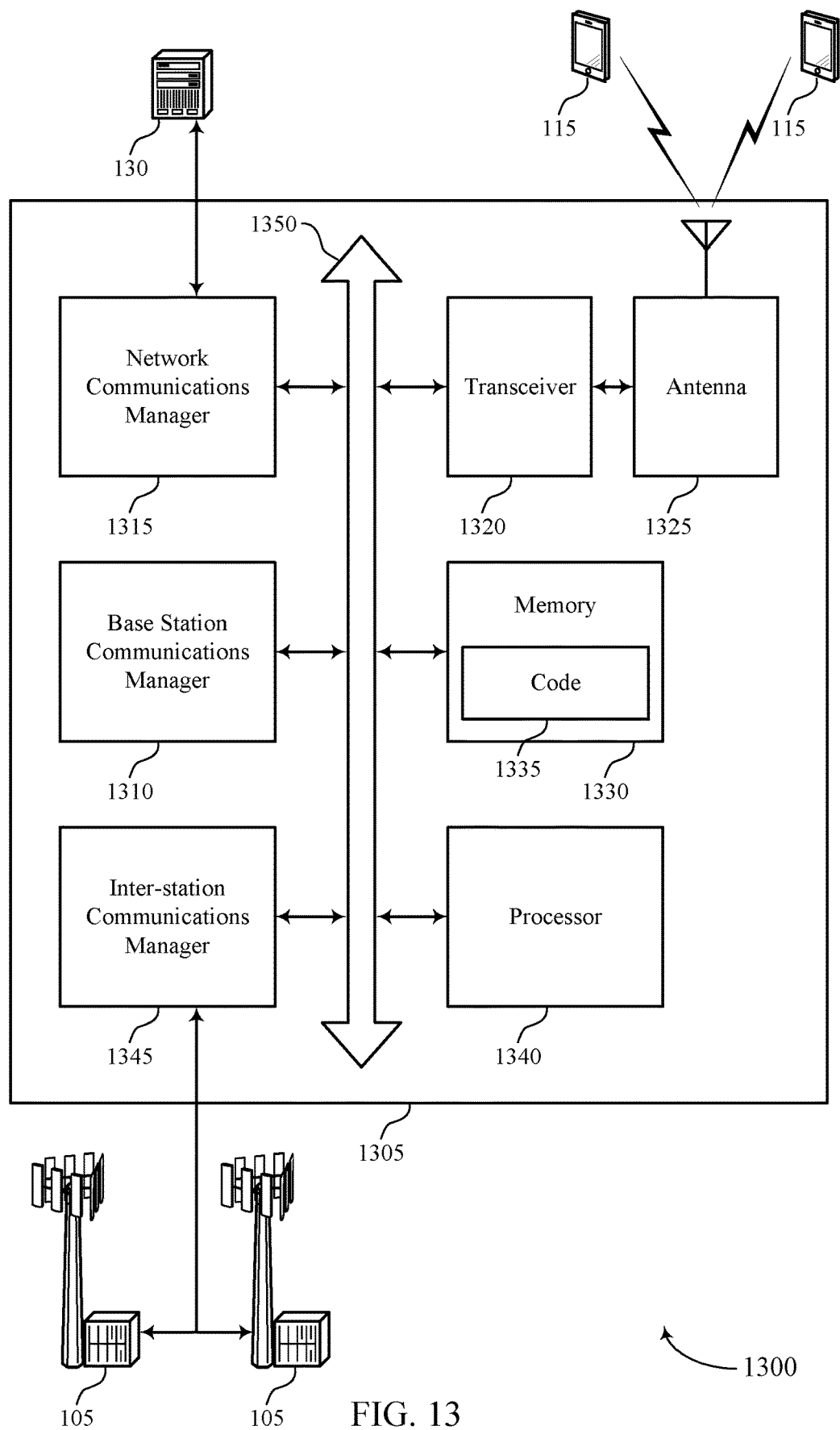
FIG. 13 shows a diagram of a system including a device that supports message 2 of a two-step random access procedure in accordance with aspects of the present disclosure.

FIG. 13 shows a diagram of a system 1300 including a device 1305 that supports message 2 of a two-step random access procedure in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may receive an uplink request message from a UE, identify that the uplink request message is a first message of a two-step RACH procedure, send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE, and send the plurality of downlink responses, including the downlink response intended for the UE, to the multiple UEs via the broadcast or multicast physical downlink shared channel. The base station communications manager 1310 may also receive an uplink request message from a UE, identify that the uplink request message is a first message of a two-step RACH procedure, send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide the downlink response for a single UE (e.g., only a single UE), and send the downlink response to the UE via the broadcast or multicast physical downlink shared channel. The base station communications manager 1310 may also identify that the base station is configured to support both a two-step RACH procedure or a four-step RACH procedure, identify an uplink resource and a radio network temporary identifier used by the UE in transmission of the uplink request message, receive an uplink request message from a UE, the uplink request message being a first message of either the two-step RACH procedure or the four-step RACH procedure, determine whether the uplink request message is part of the two-step RACH procedure or the four-step RACH procedure based on at least one of the uplink resource or the radio network temporary identifier associated with the uplink request message, and respond to the UE in accordance with whether the uplink request message is part of the two-step RACH procedure or the four-step RACH procedure.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting message 2 of a two-step random access procedure).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
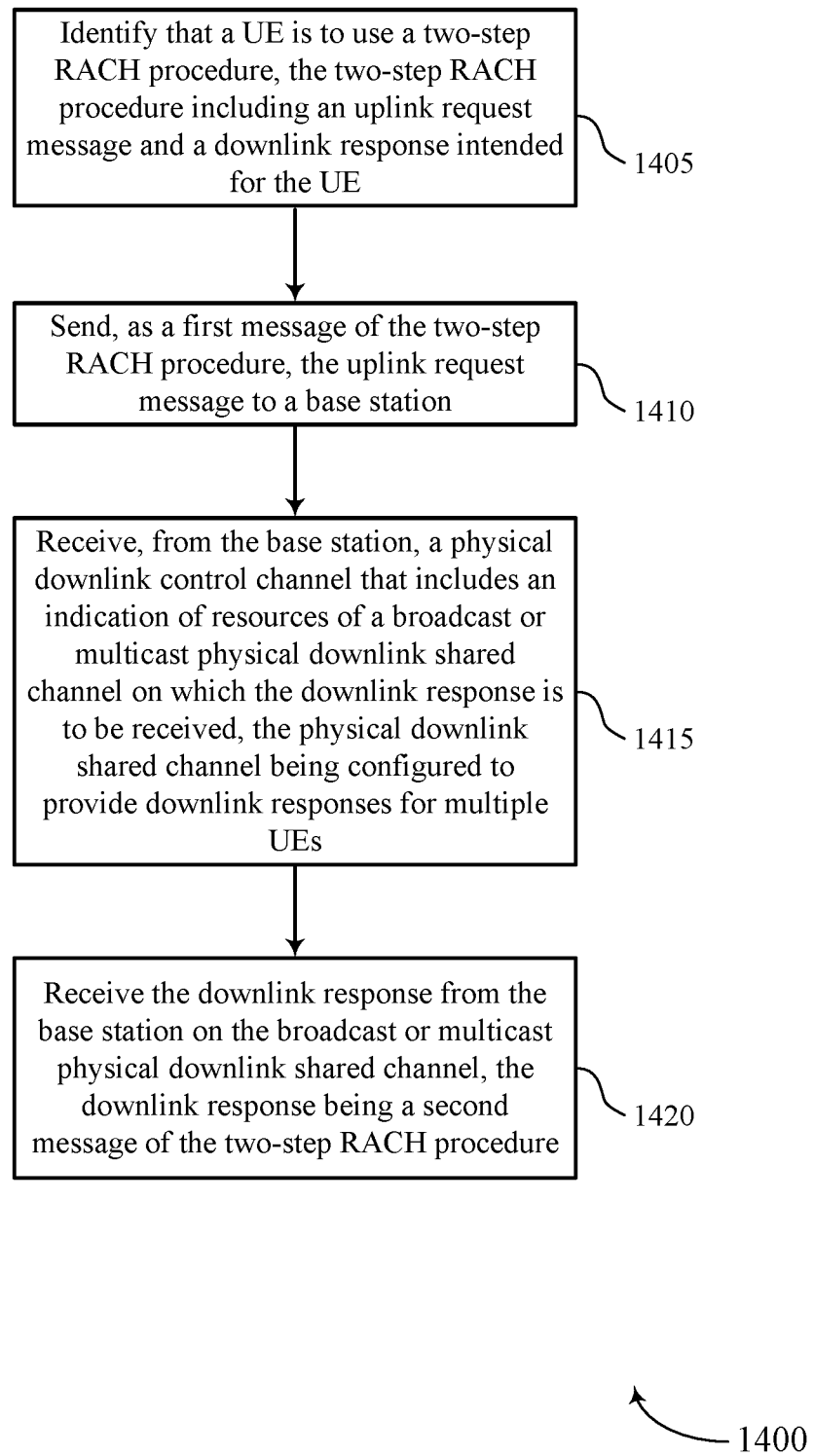
FIGS. 14 through 19 show flowcharts illustrating methods that support message 2 of a two-step random access procedure in accordance with aspects of the present disclosure.

FIG. 14 shows a flowchart illustrating a method 1400 that supports message 2 of a two-step random access procedure in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify that the UE is to use a two-step RACH procedure, the two-step RACH procedure including an uplink request message and a downlink response. The operations of 1405 may be performed according to the methods described herein. In some examples, aspects of the operations of 1405 may be performed by an identifying manager as described with reference to FIGS. 6 through 9.

At 1410, the UE may send, as a first message of the two-step RACH procedure, the uplink request message to a base station. The operations of 1410 may be performed according to the methods described herein. In some examples, aspects of the operations of 1410 may be performed by a transmission manager as described with reference to FIGS. 6 through 9.

At 1415, the UE may receive, from the base station, a physical downlink control channel comprising an indication of resources of a broadcast or multicast physical downlink shared channel on which the downlink response is to be received, the physical downlink shared channel being configured to provide downlink responses for multiple UEs. The operations of 1415 may be performed according to the methods described herein. In some examples, aspects of the operations of 1415 may be performed by a receiving manager as described with reference to FIGS. 6 through 9.

At 1420, the UE may receive the downlink response from the base station on the broadcast or multicast physical downlink shared channel, the downlink response being a second message of the two-step RACH procedure. The operations of 1420 may be performed according to the methods described herein. In some examples, aspects of the operations of 1420 may be performed by a receiving manager as described with reference to FIGS. 6 through 9.

Figure 15:
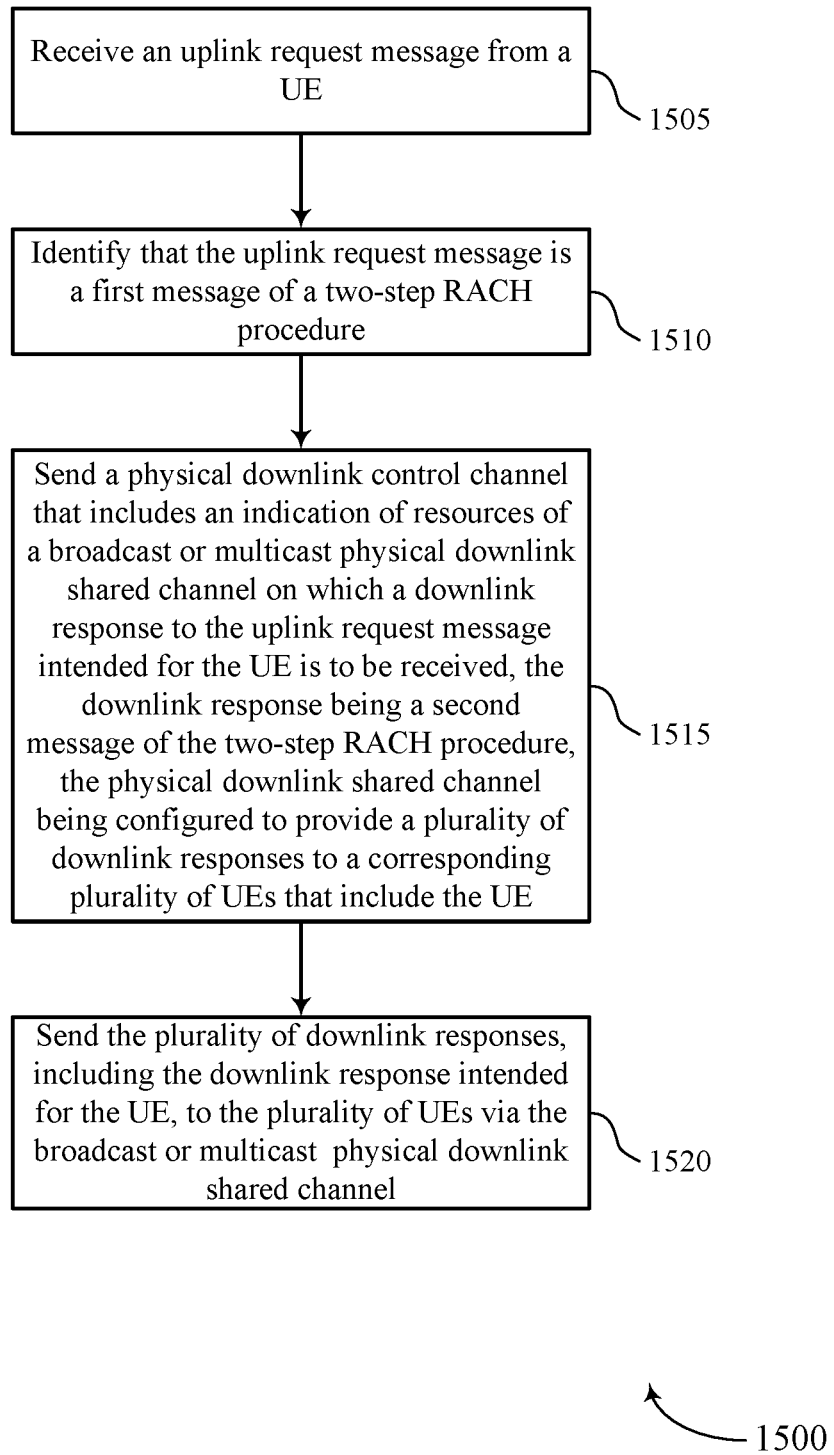

FIG. 15 shows a flowchart illustrating a method 1500 that supports message 2 of a two-step random access procedure in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1505, the base station may receive an uplink request message from a UE. The operations of 1505 may be performed according to the methods described herein. In some examples, aspects of the operations of 1505 may be performed by a receiving manager as described with reference to FIGS. 10 through 13.

At 1510, the base station may identify that the uplink request message is a first message of a two-step RACH procedure. The operations of 1510 may be performed according to the methods described herein. In some examples, aspects of the operations of 1510 may be performed by an identifying manager as described with reference to FIGS. 10 through 13.

At 1515, the base station may send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE. The operations of 1515 may be performed according to the methods described herein. In some examples, aspects of the operations of 1515 may be performed by a transmission manager as described with reference to FIGS. 10 through 13.

At 1520, the base station may send the plurality of downlink responses, including the downlink response intended for the UE, to the multiple UEs via the broadcast or multicast physical downlink shared channel. The operations of 1520 may be performed according to the methods described herein. In some examples, aspects of the operations of 1520 may be performed by a transmission manager as described with reference to FIGS. 10 through 13.

Figure 16:
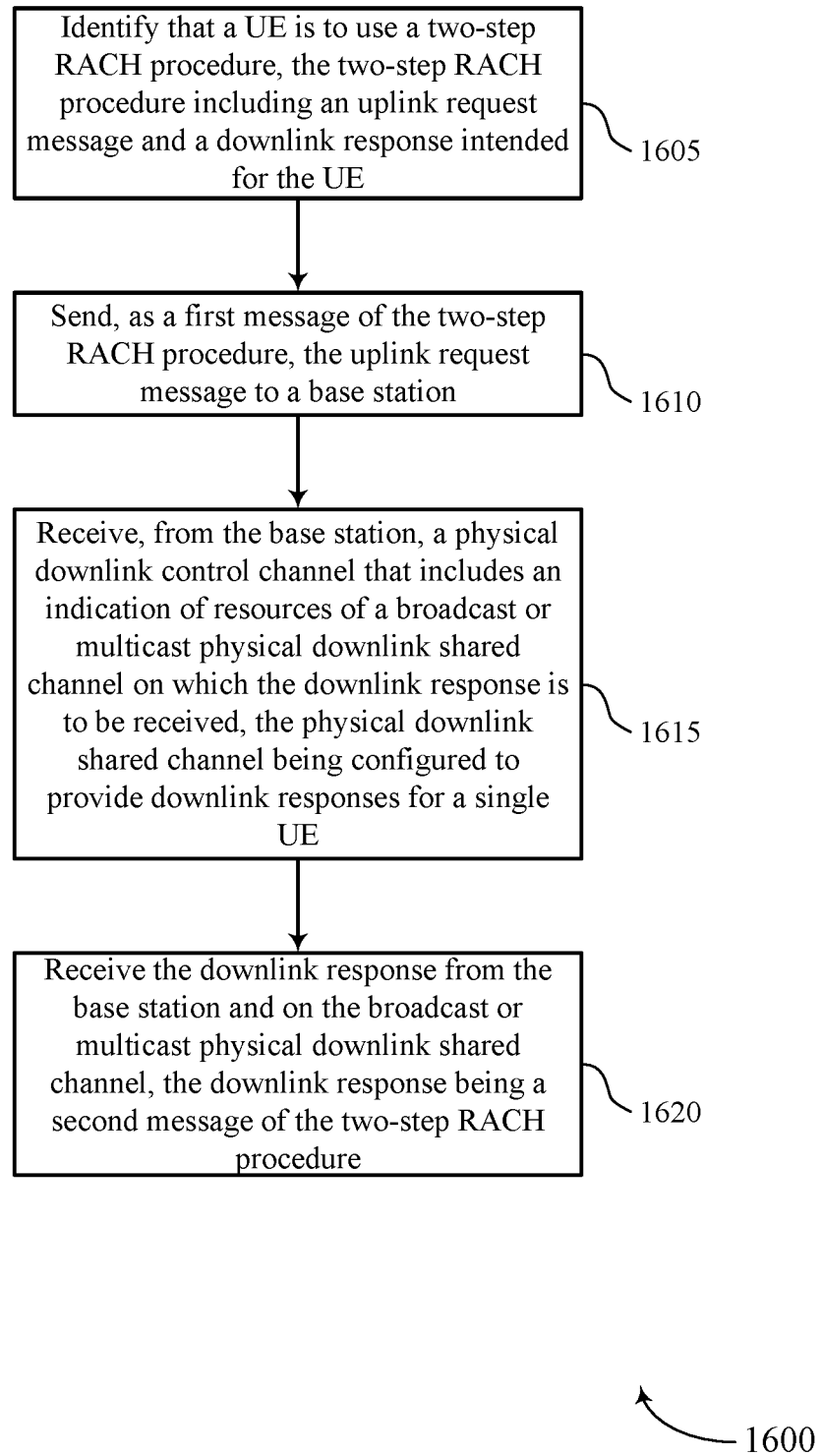

FIG. 16 shows a flowchart illustrating a method 1600 that supports message 2 of a two-step random access procedure in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may identify that the UE is to use a two-step RACH procedure, the two-step RACH procedure including an uplink request message and a downlink response. The operations of 1605 may be performed according to the methods described herein. In some examples, aspects of the operations of 1605 may be performed by an identifying manager as described with reference to FIGS. 6 through 9.

At 1610, the UE may send, as a first message of the two-step RACH procedure, the uplink request message to a base station. The operations of 1610 may be performed according to the methods described herein. In some examples, aspects of the operations of 1610 may be performed by a transmission manager as described with reference to FIGS. 6 through 9.

At 1615, the UE may receive, from the base station, a physical downlink control channel comprising an indication of resources of a physical downlink shared channel on which the downlink response is to be received, the physical downlink shared channel being configured to provide downlink responses for a single UE. The operations of 1615 may be performed according to the methods described herein. In some examples, aspects of the operations of 1615 may be performed by a receiving manager as described with reference to FIGS. 6 through 9.

At 1620, the UE may receive the downlink response from the base station on the broadcast or multicast physical downlink shared channel, the downlink response being a second message of the two-step RACH procedure. The operations of 1620 may be performed according to the methods described herein. In some examples, aspects of the operations of 1620 may be performed by a receiving manager as described with reference to FIGS. 6 through 9.

Figure 17:
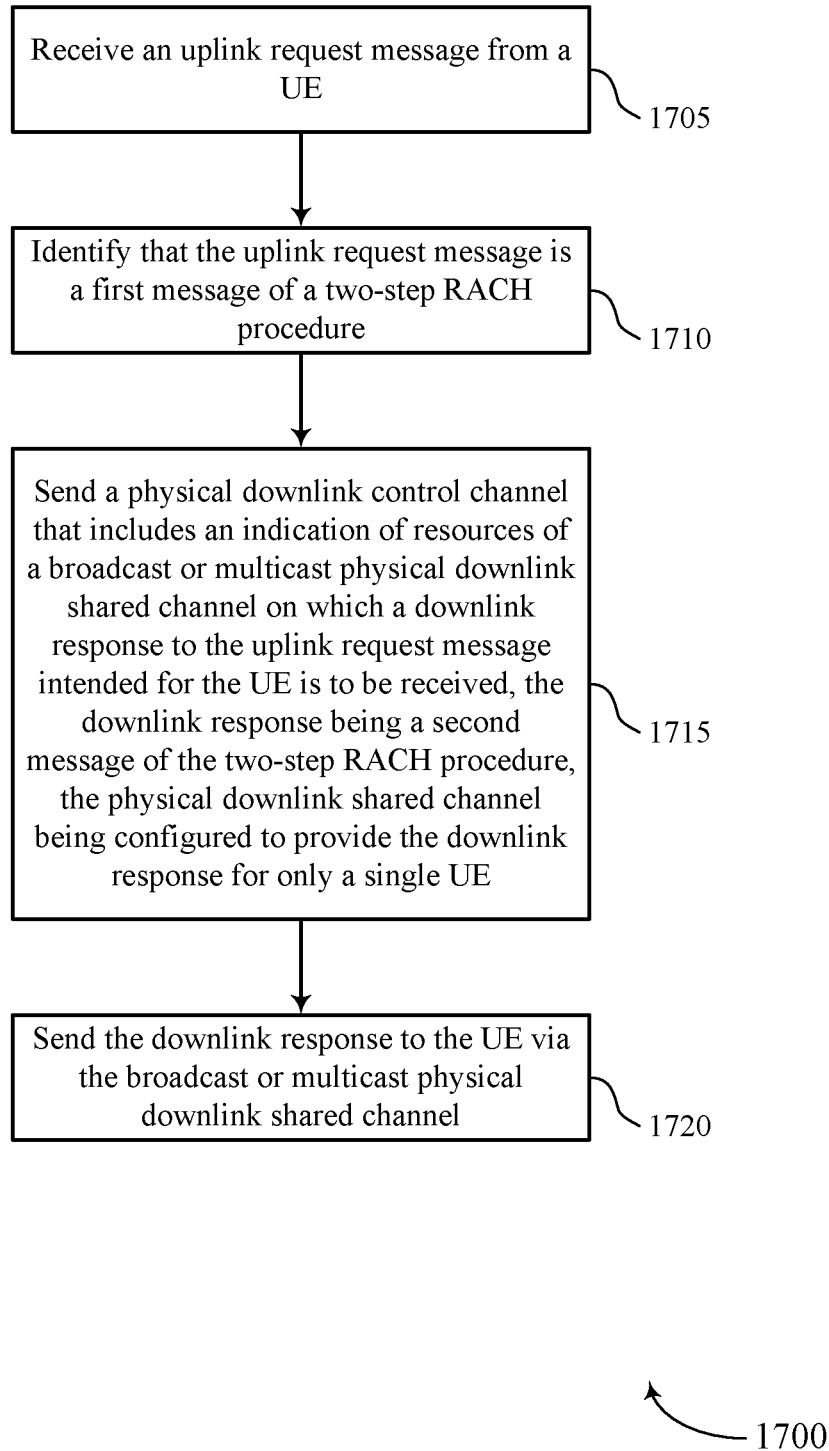

FIG. 17 shows a flowchart illustrating a method 1700 that supports message 2 of a two-step random access procedure in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may receive an uplink request message from a UE. The operations of 1705 may be performed according to the methods described herein. In some examples, aspects of the operations of 1705 may be performed by a receiving manager as described with reference to FIGS. 10 through 13.

At 1710, the base station may identify that the uplink request message is a first message of a two-step RACH procedure. The operations of 1710 may be performed according to the methods described herein. In some examples, aspects of the operations of 1710 may be performed by an identifying manager as described with reference to FIGS. 10 through 13.

At 1715, the base station may send a physical downlink control channel comprising an indication of resources of a physical downlink shared channel on which a downlink response to the uplink request message intended for the UE is to be received, the downlink response being a second message of the two-step RACH procedure, the physical downlink shared channel being configured to provide the downlink response for a single UE. The operations of 1715 may be performed according to the methods described herein. In some examples, aspects of the operations of 1715 may be performed by a transmission manager as described with reference to FIGS. 10 through 13.

At 1720, the base station may send the downlink response to the UE via the broadcast or multicast physical downlink shared channel. The operations of 1720 may be performed according to the methods described herein. In some examples, aspects of the operations of 1720 may be performed by a transmission manager as described with reference to FIGS. 10 through 13.

Figure 18:
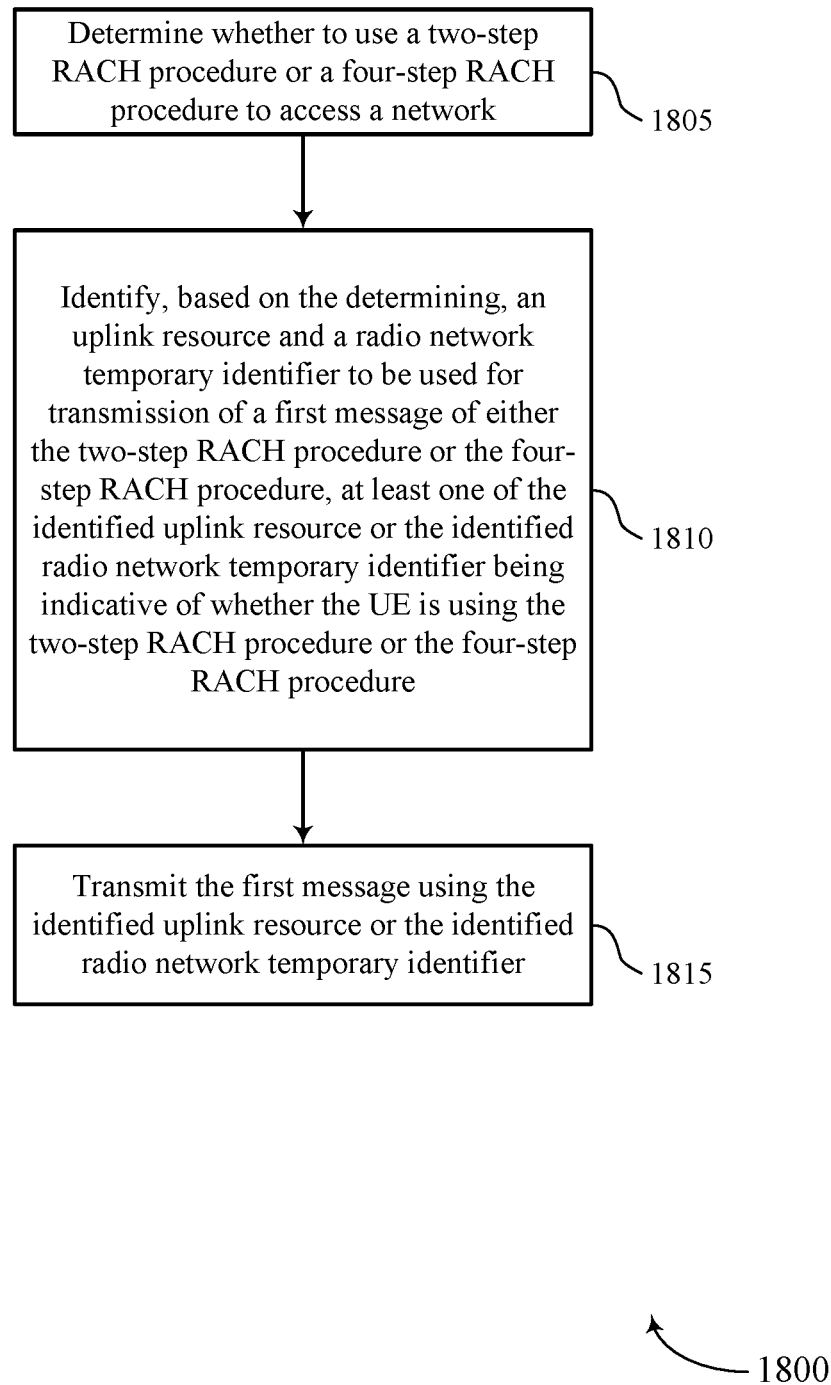

FIG. 18 shows a flowchart illustrating a method 1800 that supports message 2 of a two-step random access procedure in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may determine whether to use a two-step RACH procedure or a four-step RACH procedure to access a network. The operations of 1805 may be performed according to the methods described herein. In some examples, aspects of the operations of 1805 may be performed by an analysis manager as described with reference to FIGS. 6 through 9.

At 1810, the UE may identify, based on the determining, an uplink resource and a radio network temporary identifier to be used for transmission of a first message of either the two-step RACH procedure or the four-step RACH procedure, at least one of the identified uplink resource or the identified radio network temporary identifier being indicative of whether the UE is using the two-step RACH procedure or the four-step RACH procedure. The operations of 1810 may be performed according to the methods described herein. In some examples, aspects of the operations of 1810 may be performed by an identifying manager as described with reference to FIGS. 6 through 9.

At 1815, the UE may transmit the first message using the identified uplink resource or the identified radio network temporary identifier. The operations of 1815 may be performed according to the methods described herein. In some examples, aspects of the operations of 1815 may be performed by a transmission manager as described with reference to FIGS. 6 through 9.

Figure 19:
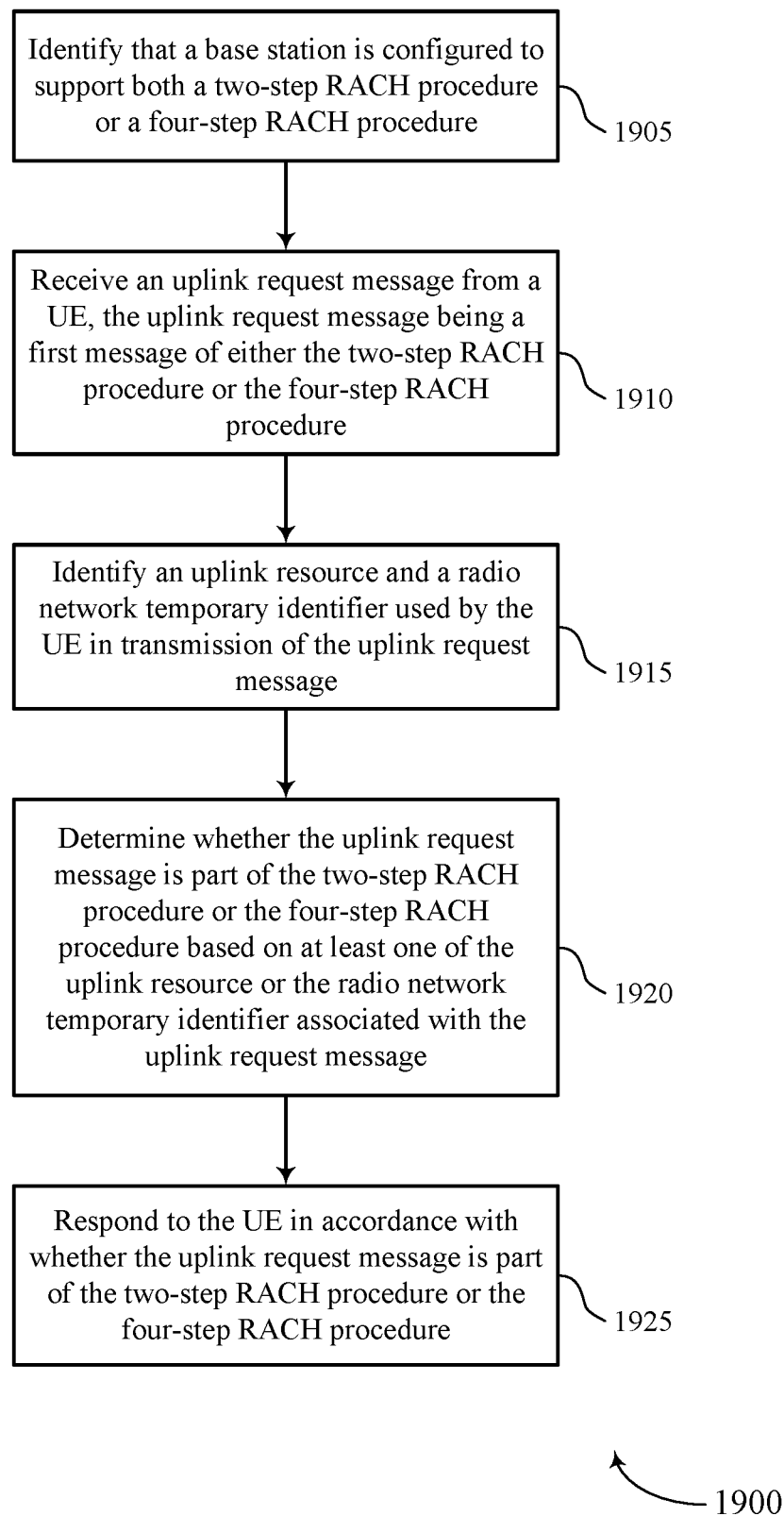

FIG. 19 shows a flowchart illustrating a method 1900 that supports message 2 of a two-step random access procedure in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may identify that the base station is configured to support both a two-step RACH procedure or a four-step RACH procedure. The operations of 1905 may be performed according to the methods described herein. In some examples, aspects of the operations of 1905 may be performed by an identifying manager as described with reference to FIGS. 10 through 13.

At 1910, the base station may receive an uplink request message from a UE, the uplink request message being a first message of either the two-step RACH procedure or the four-step RACH procedure. The operations of 1910 may be performed according to the methods described herein. In some examples, aspects of the operations of 1910 may be performed by a receiving manager as described with reference to FIGS. 10 through 13.

At 1915, the base station may identify an uplink resource and a radio network temporary identifier used by the UE in transmission of the uplink request message. The operations of 1915 may be performed according to the methods described herein. In some examples, aspects of the operations of 1915 may be performed by an identifying manager as described with reference to FIGS. 10 through 13.

At 1920, the base station may determine whether the uplink request message is part of the two-step RACH procedure or the four-step RACH procedure based on at least one of the uplink resource or the radio network temporary identifier associated with the uplink request message. The operations of 1920 may be performed according to the methods described herein. In some examples, aspects of the operations of 1920 may be performed by an analysis manager as described with reference to FIGS. 10 through 13.

At 1925, the base station may respond to the UE in accordance with whether the uplink request message is part of the two-step RACH procedure or the four-step RACH procedure. The operations of 1925 may be performed according to the methods described herein. In some examples, aspects of the operations of 1925 may be performed by a response manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Example 1

A method for wireless communication at a user equipment (UE), comprising: identifying that the UE is to use a two-step random access channel (RACH) procedure, the two-step RACH procedure including an uplink request message and a downlink response; sending, as a first message of the two-step RACH procedure, the uplink request message to a base station; receiving, from the base station, a physical downlink control channel comprising an indication of resources of a broadcast or multicast physical downlink shared channel on which the downlink response is to be received, the physical downlink shared channel being configured to provide downlink responses for multiple UEs; and receiving the downlink response from the base station on the broadcast or multicast physical downlink shared channel, the downlink response being a second message of the two-step RACH procedure.

Example 2

The method of example 1, further comprising: determining a group random access radio network temporary identifier; decoding the physical downlink control channel based at least in part on the group random access radio network temporary identifier; decoding the broadcast or multicast physical downlink shared channel in accordance with the indication received on the physical downlink control channel; and identifying that downlink responses for multiple UEs included within the broadcast or multicast physical downlink shared channel are multiplexed at a media access control layer, where the downlink response intended for the UE is one of the multiplexed downlink responses.

Example 3

The method of any of examples 1 or 2, where the physical downlink control channel includes one or more of a new data indicator, a redundancy version identifier, an acknowledgement resource indicator, or a hybrid automatic repeat request (HARQ) process identifier.

Example 4

The method of any of examples 1 to 3, further comprising: sending an acknowledgement (ACK) to the base station after successfully decoding the broadcast or multicast physical downlink shared channel and after identifying the downlink response intended for the UE.

Example 5

The method of any of examples 1 to 4, where sending the ACK to the base station comprises: transmitting the ACK using resources identified by a combination of the acknowledgement resource indicator included in the physical downlink control channel and an additional acknowledgement resource indicator included in the downlink response intended for the UE.

Example 6

The method of any of examples 1 to 5, further comprising: refraining from transmitting a negative acknowledgement (NACK) when decoding the broadcast or multicast physical downlink shared channel is unsuccessful or the downlink response intended for the UE is corrupted or unreadable.

Example 7

The method of any of examples 1 to 6, further comprising: receiving, based at least in part on refraining from transmitting a NACK, a retransmission of the downlink response intended for the UE.

Example 8

The method of any of examples 1 to 7, where the retransmission includes each of the downlink responses included in the broadcast or multicast physical downlink shared channel.

Example 9

The method of any of examples 1 to 7, where the retransmission includes fewer downlink responses than those included in the broadcast or multicast physical downlink shared channel.

Example 10

The method of any of examples 1 to 9, further comprising: refraining from transmitting any hybrid automatic repeat request (HARQ) feedback with respect to decoding the physical downlink control channel or decoding the broadcast or multicast physical downlink shared channel.

Example 11

The method of any of examples 1 to 10, where the physical downlink control channel uses a larger transport block scaling than would be used if HARQ feedback were to be transmitted.

Example 12

The method of any of examples 1 to 10, where the physical downlink control channel lacks one or more of a HARQ process identifier, a new data indicator, or a redundancy version identifier.

Example 13

The method of any of examples 1 to 12, further comprising: identifying an uplink grant in the downlink response intended for the UE, the uplink grant indicating resources for transmission by the UE of a confirmation message that confirms the UE received the downlink response intended for the UE or the broadcast or multicast physical downlink shared channel; and transmitting the confirmation message based at least in part on the uplink grant.

Example 14

The method of any of examples 1 to 13, where the downlink response intended for the UE includes one or more of a random access preamble index, a cell radio network temporary identifier, or a UE identifier.

Example 15

A method for wireless communication at a base station: receiving an uplink request message from a user equipment (UE); identifying that the uplink request message is a first message of a two-step random access channel (RACH) procedure; sending a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a downlink response to each of multiple UEs; and sending the plurality of downlink responses, including the downlink response intended for the UE, to the multiple UEs via the broadcast or multicast physical downlink shared channel.

Example 16

The method of example 15, further comprising: multiplexing at a media access control layer of the broadcast or multicast physical downlink shared channel the downlink responses for the plurality of UEs, where the downlink response intended for the UE is one of the multiplexed downlink responses.

Example 17

The method of claim 15 or 16, further comprising: including in each of the multiple downlink responses at least one of random access preamble index (RAPID), timing advance (TA), cell radio network temporary identifier, and UE identifier, or any combination thereof.

Example 18

The method of any of examples 15 to 17, further comprising: including in the broadcast or multicast physical downlink shared channel an acknowledgement/negative acknowledgement (ACK/NACK) resource indicator (ARI) for each of the plurality of downlink responses to indicate separate ACK/NACK feedback resources for each RAPID.

Example 19

The method of any of examples 15 to 18, further comprising: sending to the multiple UEs via the broadcast or multicast physical downlink shared channel a retransmission of the physical downlink shared channel.

Example 20

The method of any of examples 15 to 19, further comprising: sending the retransmission after failing to receive an ACK from any of the multiple UEs within a given time period.

Example 21

The method of any of examples 15 to 20, where the retransmission includes each of the plurality of downlink responses included in the transmission of the broadcast or multicast physical downlink shared channel.

Example 22

The method of any of examples 15 to 20, where the retransmission includes fewer downlink responses than were included in the transmission of the broadcast or multicast physical downlink shared channel.

Example 23

The method of any of examples 15 to 22, further comprising: clearing a new data indicator (NDI); and including in the retransmission of the downlink response at least one of the second message from the multiple downlink responses, at least one modified message sent previously in the transmission of the downlink response, or at least one new message transmitted for the first time in the retransmission, or any combination thereof.

Example 24

The method of any of examples 15 to 23, further comprising: including an uplink grant in the second message of the physical downlink control channel, the uplink grant indicating resources for transmission by the UE of a confirmation message that confirms the UE received the downlink response intended for the UE or the broadcast or multicast physical downlink shared channel.

Example 25

The method of any of examples 15 to 24, further comprising: confirming the UE receives the second message based at least in part on detecting a transmission on the resources indicated by the uplink grant.

Example 26

The method of any of examples 15 to 25, further comprising: refraining from including in the physical downlink control channel at least one of high availability resolution queue (HARQ) process identifier, new data indicator (NDI), and redundancy version identifier (RVID), or any combination thereof; and using a space created by the refraining for transport block (TB) scaling.

Example 27

The method of any of examples 15 to 26, further comprising: including in the physical downlink control channel at least one of new data indicator (NDI), and redundancy version identifier (RVID) for retransmission support.

Example 28

The method of any of examples 15 to 27, further comprising: scrambling a cyclic redundancy check (CRC) of the physical downlink control channel by group random access radio network temporary identifier (RA-RNTI).

Example 29

A method for wireless communication at a user equipment (UE), comprising: identifying that the UE is to use a two-step random access channel (RACH) procedure, the two-step RACH procedure including an uplink request message and a downlink response; sending, as a first message of the two-step RACH procedure, the uplink request message to a base station; receiving, from the base station, a physical downlink control channel comprising an indication of resources of a broadcast or multicast physical downlink shared channel on which the downlink response is to be received, the physical downlink shared channel being configured to provide downlink responses for a single UE; and receiving the downlink response from the base station on the broadcast or multicast physical downlink shared channel, the downlink response being a second message of the two-step RACH procedure.

Example 30

The method of example 29, further comprising: decoding the physical downlink control channel; and identifying a UE indication in the decoded physical downlink control channel, the UE indication including a hash of a UE identifier.

Example 31

The method of example 29 or 30, further comprising: analyzing the UE indication in the decoded physical downlink control channel; decoding the physical downlink shared channel after determining the UE indication indicates the second message is intended for the UE; and identifying the UE identifier in the decoded physical downlink shared channel.

Example 32

The method of any of examples 29 to 31, further comprising: sending an acknowledgement (ACK) to the base station on a resource indicated in the decoded physical downlink control channel after successful contention resolution determined by successfully decoding the physical downlink shared channel.

Example 33

The method of any of examples 29 to 32, further comprising: triggering the base station to resend the downlink response by failing to send an ACK within a set time period.

Example 34

A method for wireless communication at a base station: receiving an uplink request message from a user equipment (UE); identifying that the uplink request message is a first message of a two-step random access channel (RACH) procedure; sending a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide the downlink response for only a single UE; and sending the downlink response to the UE via the broadcast or multicast physical downlink shared channel.

Example 35

The method of example 34, further comprising: including in the physical downlink control channel a UE indication that includes a hash of a UE identifier and a random access preamble index (RAPID) combination of the UE.

Example 36

The method of example 34 or 35, further comprising: including in the second message a UE identifier that maps to the hash.

Example 37

The method of any of examples 34 to 36, further comprising: using the UE identifier to replace the hybrid automatic repeat request (HARQ) process identifier.

Example 38

The method of any of examples 34 to 37, further comprising: withholding transmission of a downlink response to a second UE when the UE identifier and RAPID combination of the UE and UE identifier and RAPID combination of the second UE both hash to the UE indication.

Example 39

The method of any of examples 34 to 38, further comprising: refraining from retransmitting the downlink response after receiving from the UE an acknowledgement (ACK) within a set time period.

Example 40

The method of any of examples 34 to 39, further comprising: sending to the UE via the broadcast or multicast physical downlink shared channel a retransmission of the downlink response as originally transmitted after failing to receive an acknowledgement (ACK) from the UE within a set time period.

Example 41

A method for wireless communication at a user equipment (UE), comprising: determining whether to use a two-step random access channel (RACH) procedure or a four-step RACH procedure to access a network; identifying, based at least in part on the determining, an uplink resource and a radio network temporary identifier to be used for transmission of a first message of either the two-step RACH procedure or the four-step RACH procedure, at least one of the identified uplink resource or the identified radio network temporary identifier being indicative of whether the UE is using the two-step RACH procedure or the four-step RACH procedure; and transmitting the first message using the identified uplink resource or the identified radio network temporary identifier.

Example 42

The method of example 41, further comprising: receiving system information comprising an indication of a resource mapping between a synchronization signal burst and uplink resources for either the two-step RACH procedure or the four-step RACH procedure, where the identified uplink resource is one of the uplink resources identified by the resource mapping.

Example 43

The method of example 41 or 42, further comprising: receiving information from a base station regarding whether the UE is to use the two-step RACH procedure or the four-step RACH procedure.

Example 44

The method of any of examples 41 to 43, where the uplink resources of the two-step RACH procedure and the uplink resources of the four-step RACH procedure differ in one or more aspects, the one or more aspects including at least one of time domain multiplexing, frequency domain multiplexing, and code division multiplexing.

Example 45

The method of any of examples 41 to 44, further comprising: allocating one or more preambles for a two-step RACH occasion of the two-step RACH procedure; and allocating one or more preambles for a four-step RACH occasion of the four-step RACH procedure.

Example 46

The method of any of examples 41 to 45, further comprising: using the four-step RACH procedure when decoding of a message associated with the two-step RACH procedure fails, where a synchronization signal block is mapped to a first set of resources of the two-step RACH procedure and to a second set of resources for the four-step RACH procedure.

Example 47

A method for wireless communication at a base station: receiving an uplink request message from a user equipment (UE), the uplink request message being a first message of either a two-step RACH procedure or a four-step RACH procedure; identifying an uplink resource and a radio network temporary identifier used by the UE in transmission of the uplink request message; determining whether the uplink request message is part of the two-step RACH procedure or the four-step RACH procedure based at least in part on at least one of the uplink resource or the radio network temporary identifier associated with the uplink request message; and responding to the UE in accordance with whether the uplink request message is part of the two-step RACH procedure or the four-step RACH procedure.

Example 48

The method of example 47, further comprising: multiplexing, in the response to the UE, a random access response (RAR) for the two-step RACH procedure with a RAR for the four-step RACH procedure.

Example 49

The method of example 47 or 48, further comprising: configuring the RAR for the two-step RACH procedure to differ from the RAR for the four-step RACH procedure in at least one aspect.

Example 50

The method of any of examples 47 to 49, further comprising: computing a first radio network temporary identifier for the two-step RACH procedure and a second radio network temporary identifier for the four-step RACH procedure different from the first radio network temporary identifier; and including in the response to the UE either a message for the two-step RACH procedure or a message for the four-step RACH procedure based at least in part on whether the uplink request message is part of the two-step RACH procedure or the four-step RACH procedure.

Example 51

The method of any of examples 47 to 50, further comprising: including in the response to the UE a first preamble for the first radio network temporary identifier and a second preamble for the second radio network temporary identifier.

Example 52

The method of any of examples 47 to 51, further comprising: configuring both the two-step RACH procedure and the four-step RACH procedure at the same time; and mapping a synchronization signal block to a first set of resources of the two-step RACH procedure and to a second set of resources for the four-step RACH procedure.

Example 53

The method of any of examples 47 to 52, further comprising: configuring system information to indicate the first set of resources for a physical random access channel (PRACH) of the two-step RACH procedure and indicate the second set of resources for a PRACH of the four-step RACH procedure.

Example 54

The method of any of examples 47 to 53, further comprising: configuring frequency domain PRACH resources for the two-step RACH procedure and the resources of the four-step RACH procedure.

Example 55

An apparatus comprising at least one means for performing a method of any of examples 1 to 14.

Example 56

An apparatus for wireless communications comprising a processor; memory coupled with the processor; and instructions stored in the memory and executable by the processor to cause the apparatus to perform a method of any of examples 1 to 14.

Example 57

A non-transitory computer-readable medium storing code for wireless communications, the code comprising instructions executable by a processor to perform a method of any of examples 1 to 14.

Example 58

An apparatus comprising at least one means for performing a method of any of examples 15 to 28.

Example 59

An apparatus for wireless communications comprising a processor; memory coupled with the processor; and instructions stored in the memory and executable by the processor to cause the apparatus to perform a method of any of examples 15 to 28.

Example 60

A non-transitory computer-readable medium storing code for wireless communications, the code comprising instructions executable by a processor to perform a method of any of examples 15 to 28.

Example 61

An apparatus comprising at least one means for performing a method of any of examples 29 to 33.

Example 62

An apparatus for wireless communications comprising a processor; memory coupled with the processor; and instructions stored in the memory and executable by the processor to cause the apparatus to perform a method of any of examples 29 to 33.

Example 63

A non-transitory computer-readable medium storing code for wireless communications, the code comprising instructions executable by a processor to perform a method of any of examples 29 to 33.

Example 64

An apparatus comprising at least one means for performing a method of any of examples 34 to 40.

Example 65

An apparatus for wireless communications comprising a processor; memory coupled with the processor; and instructions stored in the memory and executable by the processor to cause the apparatus to perform a method of any of examples 34 to 40.

Example 66

A non-transitory computer-readable medium storing code for wireless communications, the code comprising instructions executable by a processor to perform a method of any of examples 34 to 40.

Example 67

An apparatus comprising at least one means for performing a method of any of examples 41 to 46.

Example 68

An apparatus for wireless communications comprising a processor; memory coupled with the processor; and instructions stored in the memory and executable by the processor to cause the apparatus to perform a method of any of examples 41 to 46.

Example 69

A non-transitory computer-readable medium storing code for wireless communications, the code comprising instructions executable by a processor to perform a method of any of examples 41 to 46.

Example 70

An apparatus comprising at least one means for performing a method of any of examples 47 to 54.

Example 71

An apparatus for wireless communications comprising a processor; memory coupled with the processor; and instructions stored in the memory and executable by the processor to cause the apparatus to perform a method of any of examples 47 to 54.

Example 72

A non-transitory computer-readable medium storing code for wireless communications, the code comprising instructions executable by a processor to perform a method of any of examples 47 to 54.

What is claimed is:
1. A method for wireless communication at a user equipment (UE), comprising:
   identifying that the UE is to use a two-step random access channel (RACH) procedure, the two-step RACH procedure including an uplink request message and a downlink response intended for the UE;
   sending, as a first message of the two-step RACH procedure, the uplink request message to a base station;
   determining a group random access radio network temporary identifier;
   receiving, from the base station, a physical downlink control channel comprising an indication of resources of a broadcast or multicast physical downlink shared channel on which the downlink response is to be received;
   decoding the physical downlink control channel based at least in part on the group random access radio network temporary identifier;

decoding the broadcast or multicast physical downlink shared channel in accordance with the indication received on the physical downlink control channel;

receiving the downlink response from the base station on the broadcast or multicast physical downlink shared channel, the downlink response being a second message of the two-step RACH procedure including downlink responses for multiple UEs multiplexed at a media access control layer, wherein the downlink response intended for the UE is one of the multiplexed downlink responses, and identifying an uplink grant in the downlink response intended for the UE, the uplink grant indicating resources for transmission by the UE of a confirmation message that confirms the UE received the downlink response intended for the UE on the broadcast or multicast physical downlink shared channel;

refraining from transmitting hybrid automatic repeat request (HARQ) feedback with respect to decoding the physical downlink control channel or decoding the broadcast or multicast physical downlink shared channel; and transmitting the confirmation message based at least in part on the uplink grant.

2. The method of claim 1, wherein the physical downlink control channel includes one or more of a new data indicator, a redundancy version identifier, an acknowledgement resource indicator, or a hybrid automatic repeat request (HARQ) process identifier.

3. The method of claim 1, further comprising:
receiving, based at least in part on the refraining from transmitting HARQ feedback, a retransmission of the downlink response intended for the UE.

4. The method of claim 3, wherein the retransmission includes each of the downlink responses included in the broadcast or multicast physical downlink shared channel.

5. The method of claim 3, wherein the retransmission includes fewer downlink responses than those included in the broadcast or multicast physical downlink shared channel.

6. The method of claim 1, wherein the physical downlink control channel uses a larger transport block scaling than would be used if HARQ feedback were to be transmitted.

7. The method of claim 1, wherein the physical downlink control channel lacks one or more of a HARQ process identifier, a new data indicator, or a redundancy version identifier.

8. The method of claim 1, wherein the downlink response intended for the UE includes one or more of a random access preamble index, a cell radio network temporary identifier, or a UE identifier.

9. A method for wireless communication at a base station:
receiving an uplink request message from a user equipment (UE);
identifying that the uplink request message is a first message of a two-step random access channel (RACH) procedure;
sending a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE;

scrambling a cyclic redundancy check (CRC) of the physical downlink control channel by a group random access radio network temporary identifier;

sending the plurality of downlink responses multiplexed at a media access control (MAC) layer, including the downlink response intended for the UE, to the plurality of UEs via the broadcast or multicast physical downlink shared channel, wherein the downlink response intended for the UE comprises an uplink grant, the uplink grant indicating resources for transmission by the UE of a confirmation message that confirms the UE received the downlink response intended for the UE; and confirming whether the UE receives the second message based at least in part on detecting a transmission on the resources indicated by the uplink grant.

10. The method of claim 9, further comprising:
including in each of the plurality of downlink responses at least one of a random access preamble index (RAPID), a timing advance (TA), a cell radio network temporary identifier, a UE identifier, or any combination thereof.

11. The method of claim 10, further comprising:
including in the broadcast or multicast physical downlink shared channel an acknowledgement/negative acknowledgement (ACK/NACK) resource indicator (ARI) for each of the plurality of downlink responses to indicate separate ACK/NACK feedback resources for each RAPID.

12. The method of claim 9, further comprising:
sending via the broadcast or multicast physical downlink shared channel a retransmission of at least some of the plurality of downlink responses.

13. The method of claim 12, further comprising:
sending the retransmission after failing to receive an ACK from any of the plurality of UEs within a given time period.

14. The method of claim 13, wherein the retransmission includes each of the plurality of downlink responses included in the transmission of the broadcast or multicast physical downlink shared channel.

15. The method of claim 13, wherein the retransmission includes fewer downlink responses than were included in the transmission of the broadcast or multicast physical downlink shared channel.

16. The method of claim 12, further comprising:
clearing a new data indicator (NDI); and
including in the retransmission of the plurality of downlink responses at least one of the downlink response intended for the UE from the plurality of downlink responses, at least one modified message sent previously in the transmission of the plurality of downlink responses, or at least one new message transmitted for the first time in the retransmission, or any combination thereof.

17. The method of claim 9, further comprising:
refraining from including in the physical downlink control channel at least one of a hybrid automatic repeat request (HARQ) process identifier, a new data indicator (NDI), a redundancy version identifier (RVID), or any combination thereof; and
using a space created by the refraining for transport block (TB) scaling.

18. The method of claim 9, further comprising:
including in the physical downlink control channel at least one of a new data indicator (NDI), or a redundancy version identifier (RVID) for retransmission support.

19. An apparatus for wireless communication at a user equipment (UE), comprising:
- a processor,
- memory coupled with the processor; and
- instructions stored in the memory and executable by the processor to cause the apparatus to:
  - identify that the UE is to use a two-step random access channel (RACH) procedure, the two-step RACH procedure including an uplink request message and a downlink response;
  - send, as a first message of the two-step RACH procedure, the uplink request message to a base station;
  - determine a group random access radio network temporary identifier;
  - receive, from the base station, a physical downlink control channel comprising an indication of resources of a broadcast or multicast physical downlink shared channel on which the downlink response is to be received;
  - decode the physical downlink control channel based at least in part on the group random access radio network temporary identifier;
  - decode the broadcast or multicast physical downlink shared channel in accordance with the indication received on the physical downlink control channel;
  - receive the downlink response from the base station on the broadcast or multicast physical downlink shared channel, the downlink response being a second message of the two-step RACH procedure including downlink responses for multiple UEs multiplexed at a media access control layer, wherein the downlink response intended for the UE is one of the multiplexed downlink responses;
  - identify an uplink grant in the downlink response intended for the UE, the uplink grant indicating resources for transmission by the UE of a confirmation message that confirms the UE received the downlink response intended for the UE on the broadcast or multicast physical downlink shared channel;
  - refrain from transmitting hybrid automatic repeat request (HARQ) feedback with respect to decoding the physical downlink control channel or decoding the broadcast or multicast physical downlink shared channel; and
  - transmit the confirmation message based at least in part on the uplink grant.

20. The apparatus of claim 19, wherein the physical downlink control channel includes one or more of a new data indicator, a redundancy version identifier, an acknowledgement resource indicator, or a hybrid automatic repeat request (HARQ) process identifier.

21. The apparatus of claim 19, wherein the instructions are further executable by the processor to cause the apparatus to:
- refrain from transmitting a negative acknowledgement (NACK) when decoding the broadcast or multicast physical downlink shared channel is unsuccessful or the downlink response intended for the UE is corrupted or unreadable.

22. An apparatus for wireless communication at a base station, comprising:
- a processor,
- memory coupled with the processor; and
- instructions stored in the memory and executable by the processor to cause the apparatus to:
  - receive an uplink request message from a user equipment (UE);
  - identify that the uplink request message is a first message of a two-step random access channel (RACH) procedure;
  - send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE;
  - scramble a cyclic redundancy check (CRC) of the physical downlink control channel by a group random access radio network temporary identifier;
  - send the plurality of downlink responses multiplexed at a media access control (MAC) layer, including the downlink response intended for the UE, to the plurality of UEs via the broadcast or multicast physical downlink shared channel,
  - wherein the downlink response intended for the UE comprises an uplink grant, the uplink grant indicating resources for transmission by the UE of a confirmation message that confirms the UE received the downlink response intended for the UE; and
  - confirm whether the UE receives the second message based at least in part on detecting a transmission on the resources indicated by the uplink grant.

23. An apparatus for wireless communication at a user equipment (UE), comprising:
- means for identifying that the UE is to use a two-step random access channel (RACH) procedure, the two-step RACH procedure including an uplink request message and a downlink response;
- means for sending, as a first message of the two-step RACH procedure, the uplink request message to a base station;
- means for determining a group random access radio network temporary identifier;
- means for receiving, from the base station, a physical downlink control channel comprising an indication of resources of a broadcast or multicast physical downlink shared channel on which the downlink response is to be received;
- means for decoding the physical downlink control channel based at least in part on the group random access radio network temporary identifier;
- means for decoding the broadcast or multicast physical downlink shared channel in accordance with the indication received on the physical downlink control channel;
- means for receiving the downlink response from the base station on the broadcast or multicast physical downlink shared channel, the downlink response being a second message of the two-step RACH procedure including downlink responses for multiple UEs multiplexed at a media access control layer, wherein the downlink response intended for the UE is one of the multiplexed downlink responses;
- means for identifying an uplink grant in the downlink response intended for the UE, the uplink grant indicating resources for transmission by the UE of a confirmation message that confirms the UE received the downlink response intended for the UE on the broadcast or multicast physical downlink shared channel;

means for refraining from transmitting hybrid automatic repeat request (HARQ) feedback with respect to decoding the physical downlink control channel or decoding the broadcast or multicast physical downlink shared channel; and means for transmitting the confirmation message based at least in part on the uplink grant.

24. An apparatus for wireless communication at a base station, comprising:

means for receiving an uplink request message from a user equipment (UE);

means for identifying that the uplink request message is a first message of a two-step random access channel (RACH) procedure;

means for sending a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE;

means for scrambling a cyclic redundancy check (CRC) of the physical downlink control channel by a group random access radio network temporary identifier;

means for sending the plurality of downlink responses multiplexed at a media access control (MAC) layer, including the downlink response intended for the UE, to the plurality of UEs via the broadcast or multicast physical downlink shared channel, wherein the downlink response intended for the UE comprises an uplink grant, the uplink grant indicating resources for transmission by the UE of a confirmation message that confirms the UE received the downlink response intended for the UE; and means for confirming whether the UE receives the second message based at least in part on detecting a transmission on the resources indicated by the uplink grant.

25. A non-transitory computer-readable medium storing code for wireless communication at a user equipment (UE), the code comprising instructions executable by a processor to:

identify that the UE is to use a two-step random access channel (RACH) procedure, the two-step RACH procedure including an uplink request message and a downlink response;

send, as a first message of the two-step RACH procedure, the uplink request message to a base station;

determine a group random access radio network temporary identifier;

receive, from the base station, a physical downlink control channel comprising an indication of resources of a broadcast or multicast physical downlink shared channel on which the downlink response is to be received;

decode the physical downlink control channel based at least in part on the group random access radio network temporary identifier;

decode the broadcast or multicast physical downlink shared channel in accordance with the indication received on the physical downlink control channel;

receive the downlink response from the base station on the broadcast or multicast physical downlink shared channel, the downlink response being a second message of the two-step RACH procedure including downlink responses for multiple UEs multiplexed at a media access control layer (MAC), wherein the downlink response intended for the UE is one of the multiplexed downlink responses, and identify an uplink grant in the downlink response intended for the UE, the uplink grant indicating resources for transmission by the UE of a confirmation message that confirms the UE received the downlink response intended for the UE on the broadcast or multicast physical downlink shared channel;

refrain from transmitting hybrid automatic repeat request (HARQ) feedback with respect to decoding the physical downlink control channel or decoding the broadcast or multicast physical downlink shared channel; and transmit the confirmation message based at least in part on the uplink grant.

26. A non-transitory computer-readable medium storing code for wireless communication at a base station, the code comprising instructions executable by a processor to:

receive an uplink request message from a user equipment (UE);

identify that the uplink request message is a first message of a two-step random access channel (RACH) procedure;

send a physical downlink control channel comprising an indication of resources of a broadcast or multicast physical downlink shared channel on which a downlink response to the uplink request message intended for the UE is to be received, the downlink response being a second message of the two-step RACH procedure, the physical downlink shared channel being configured to provide a plurality of downlink responses to a corresponding plurality of UEs that includes the UE;

scramble a cyclic redundancy check (CRC) of the physical downlink control channel by a group random access radio network temporary identifier;

send the plurality of downlink responses multiplexed at a media access control (MAC) layer, including the downlink response intended for the UE, to the plurality of UEs via the broadcast or multicast physical downlink shared channel, wherein the downlink response intended for the UE comprises an uplink grant, the uplink grant indicating resources for transmission by the UE of a confirmation message that confirms the UE received the downlink response intended for the UE; and confirm whether the UE receives the second message based at least in part on detecting a transmission on the resources indicated by the uplink grant.

* * * * *